US012679373B2

(12) United States Patent
Ueda et al.

(10) Patent No.: US 12,679,373 B2
(45) Date of Patent: Jul. 14, 2026

(54) DRIVER ASSISTANCE APPARATUS FOR VEHICLE

(71) Applicant: Subaru Corporation, Tokyo (JP)

(72) Inventors: Kazuaki Ueda, Tokyo (JP); Shingo Ugajin, Tokyo (JP); Hiroto Kobayashi, Tokyo (JP); Toshihiro Hayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 222 days.

(21) Appl. No.: 18/501,788

(22) Filed: Nov. 3, 2023

(65) Prior Publication Data

US 2024/0157947 A1 May 16, 2024

(30) Foreign Application Priority Data

Nov. 11, 2022 (JP) ................................. 2022-181121

(51) Int. Cl.
　*B60W 30/18* (2012.01)
　*B60W 50/00* (2006.01)
　*G08G 1/16* (2006.01)
(52) U.S. Cl.
　CPC .. *B60W 30/18163* (2013.01); *B60W 50/0098* (2013.01); *B60W 2552/10* (2020.02);
(Continued)
(58) Field of Classification Search
　CPC ....... B60W 30/18163; B60W 50/0098; B60W 2552/10; B60W 2554/4041; B60W 2554/4042; B60W 2554/804; B60W 2540/215; B60W 2554/802; B60W 2554/805; B60W 2554/402; G08G 1/16; G08G 1/167
(Continued)

(56) References Cited

U.S. PATENT DOCUMENTS

2018/0065627 A1* 3/2018 Ohmura ................ B60W 10/18
2018/0290650 A1* 10/2018 Ryne .................... B60W 10/20
(Continued)

FOREIGN PATENT DOCUMENTS

JP 2016-71514 A 5/2016

*Primary Examiner* — Hossam M Abd El Latif
(74) *Attorney, Agent, or Firm* — Rimon P.C.

(57) ABSTRACT

A driver assistance apparatus includes an environment information acquisition unit and an overtaking control processor. The environment information acquisition unit acquires a traveling environment information of an own vehicle. The overtaking control processor executes overtaking control based on relative vehicle speeds and positional relations of the own vehicle with a preceding vehicle and an adjacent-lane vehicle that are detected based on the traveling environment information. The overtaking control processor includes an overtaking schedule generator and an overtaking control execution unit. The overtaking control processor generates, in advance before the overtaking control, an overtaking schedule regarding first automatic lane change control adapted to move the own vehicle to an adjacent lane and second automatic lane change control adapted to cause the own vehicle to overtake the preceding vehicle and return to an original lane. The overtaking control execution unit automatically executes the overtaking control in accordance with the overtaking schedule.

10 Claims, 37 Drawing Sheets

(52) U.S. Cl.
CPC ............... *B60W 2554/4041* (2020.02); *B60W 2554/4042* (2020.02); *B60W 2554/804* (2020.02); *G08G 1/167* (2013.01)

(58) Field of Classification Search
USPC .......................................................... 701/23
See application file for complete search history.

(56) References Cited

U.S. PATENT DOCUMENTS

| | | | |
|---|---|---|---|
| 2019/0072970 A1* | 3/2019 | Izumori | .......... B60W 30/18145 |
| 2020/0130710 A1* | 4/2020 | Hase | ................... B60W 30/182 |
| 2022/0118982 A1* | 4/2022 | Ito | ...................... B60W 60/001 |

* cited by examiner

NO. 7

$VM > VA$
$VM > VB$
$VA = VB$
$FTI = 6$

AA

A

AM

M

AB

B

NO. 13

| OVERTAKING MODE NO. | M/A | M/B | A/B | LANE-CHANGE-START CONDITION | LANE-CHANGE-COMPLETION CONDITION | POSITION AFTER LANE CHANGE | LANE-RETURN-RESTART CONDITION | ALC CONTROL |
|---|---|---|---|---|---|---|---|---|
| 1 | F MA=2 | F MB=1 | | F T1=2 | F T2=1 | IN FRONT OF B | F T3=2 | CRUISING |
| 2 | F MA=2 | F MB=1 | | F T1=1 | F T2=2 | BEHIND B | F T3=5 | CRUISING |
| 3 | F MA=2 | F MB=1 | | F T1=3 | F T2=1 | IN FRONT OF B | F T3=2 | PRE-LANE-CHANGE ACCELERATION |
| 4 | F MA=2 | F MB=1 | | F T1=6 | F T2=2 | BEHIND B | F T3=5 | PRE-LANE-CHANGE DECELERATION |
| 5 | F MA=2 | F MB=2 | F AB=1 | F T1=2 | F T2=1 | IN FRONT OF B | F T3=2 | CRUISING |
| 6 | F MA=2 | F MB=2 | F AB=1 | F T1=1 | F T2=2 | BEHIND B | F T3=5 | CRUISING |
| 7 | F MA=2 | F MB=2 | F AB=1 | F T1=6 | | INTERRUPT LANE CHANGE | | |
| 8 | F MA=2 | F MB=2 | F AB=2 | F T1=3 | F T2=1 | IN FRONT OF B | F T3=2 | CRUISING |
| 9 | F MA=2 | F MB=2 | F AB=2 | F T1=1 | F T2=2 | IN FRONT OF B | F T3=5 | POST-LANE-CHANGE ACCELERATION |
| 10 | F MA=2 | F MB=2 | F AB=2 | F T1=6 | F T2=1 | IN FRONT OF B | F T3=2 | PRE-LANE-CHANGE DECELERATION |
| 11 | F MA=2 | F MB=2 | F AB=3 | F T1=3 | F T2=1 | IN FRONT OF B | F T3=2 | CRUISING |
| 12 | F MA=2 | F MB=2 | F AB=3 | F T1=1 | F T2=2 | BEHIND B | F T3=5 | CRUISING |
| 13 | F MA=2 | F MB=2 | F AB=3 | F T1=3 | F T2=1 | IN FRONT OF B | F T3=2 | PRE-LANE-CHANGE ACCELERATION |
| 14 | F MA=2 | F MB=2 | F AB=3 | F T1=6 | F T2=2 | BEHIND B | F T3=5 | PRE-LANE-CHANGE DECELERATION |
| 15 | F MA=2 | F MB=2 | F AB=3 | F T1=1 | F T2=2 | BEHIND B | F T3=8 | POST-LANE-CHANGE DECELERATION |
| 16 | F MA=2 | F MB=3 | F AB=3 | F T1=2 | F T2=1 | IN FRONT OF B | F T3=2 | CRUISING |
| 17 | F MA=2 | F MB=3 | F AB=3 | F T1=1 | F T2=2 | BEHIND B | F T3=5 | CRUISING |
| 18 | F MA=2 | F MB=3 | F AB=3 | F T1=2 | F T2=1 | IN FRONT OF B | F T3=8 | POST-LANE-CHANGE ACCELERATION |
| 19 | F MA=2 | F MB=3 | F AB=3 | F T1=6 | F T2=2 | BEHIND B | F T3=5 | PRE-LANE-CHANGE DECELERATION |

FIG. 30

DRIVER ASSISTANCE APPARATUS FOR VEHICLE

CROSS-REFERENCE TO RELATED APPLICATIONS

The present application claims priority from Japanese Patent Application No. 2022-181121 filed on Nov. 11, 2022, the entire contents of which are hereby incorporated by reference.

BACKGROUND

The disclosure relates to a driver assistance apparatus for a vehicle.

To make a lane change of an own vehicle while the own vehicle is traveling, a driver who drives the own vehicle first turns on a turn signal lamp switch to turn on a turn signal lamp on a lane change side, and then notifies a following vehicle traveling behind the own vehicle on the same traveling lane as the own vehicle or an adjacent lane of his/her intention to start the lane change of the own vehicle.

A recent driver assistance apparatus for a vehicle is known which performs automatic lane change (ALC) control adapted to recognize a driver's intention and start a lane change at an appropriate timing. The ALC control includes two types of control: driver instruction ALC control and driver approval ALC control. In the driver instruction ALC control, a driver turns on a turn signal lamp switch before making a lane change to send an instruction about the lane change to a driver assistance apparatus of an own vehicle. In the driver approval ALC control, a driver assistance apparatus of an own vehicle suggests the driver that a lane change should be made. When the driver approves the suggestion, the driver assistance apparatus of the own vehicle starts the ALC control.

Japanese Unexamined Patent Application Publication (JP-A) No. 2016-71514, for example, discloses a technique relating to the driver approval ALC control. In the technique disclosed in JP-A No. 2016-71514, a driver assistance apparatus for a vehicle suggests a lane change. If a turn signal lamp lever is not operated (i.e., no cancelling operation is performed) by a driver who drives the vehicle within a predetermined period of time, it is determined that the driver has approved the ALC control, and the driver assistance apparatus turns on the turn signal lamp on a lane change side. In contrast, if the turn signal lamp lever is operated (i.e., a cancelling operation is performed) by the driver within the predetermined period of time, it is determined that the driver has disapproved the suggestion regarding the lane change, and the driver assistance apparatus refrains from turning on the turn signal lamp.

SUMMARY

An aspect of the disclosure provides a driver assistance apparatus. The driver assistance apparatus includes an environment information acquisition unit and an overtaking control processor. The environment information acquisition unit is configured to acquire information on a traveling environment surrounding a first vehicle to which the driver assistance apparatus is to be applied. The overtaking control processor is configured to execute overtaking control based on a relative vehicle speed and a positional relation between the first vehicle and a second vehicle and a relative vehicle speed and a positional relation between the first vehicle and a third vehicle that are detected based on the information on the traveling environment acquired by the environment information acquisition unit. The second vehicle is a vehicle traveling immediately in front of the first vehicle, and the third vehicle is a vehicle traveling on an adjacent lane. The overtaking control processor includes an overtaking schedule generator and an overtaking control execution unit. The overtaking schedule generator is configured to generate an overtaking schedule regarding first automatic lane change control and second automatic lane change control in advance before a start of the overtaking control. The first automatic lane change control is control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, and the second automatic lane change control is control adapted to cause the first vehicle to overtake the second vehicle and return from the adjacent lane to the original lane. The overtaking control execution unit is configured to automatically execute the overtaking control in accordance with the overtaking schedule generated by the overtaking schedule generator.

An aspect of the disclosure provides a driver assistance apparatus including a sensor and circuitry. The sensor is configured to acquire information on a traveling environment surrounding a first vehicle to which the driver assistance apparatus is to be applied. The circuitry is configured to execute overtaking control based on a relative vehicle speed and a positional relation between the first vehicle and a second vehicle and a relative vehicle speed and a positional relation between the first vehicle and a third vehicle that are detected based on the information on the traveling environment acquired by the sensor. The second vehicle is a vehicle traveling immediately in front of the first vehicle, and the third vehicle is a vehicle traveling on an adjacent lane. The circuitry is configured to, when the overtaking control is to be executed, generate an overtaking schedule regarding first automatic lane change control and second automatic lane change control in advance before starting the overtaking control, and automatically execute the overtaking control in accordance with the overtaking schedule generated. The first automatic lane change control is control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, and the second automatic lane change control is control adapted to cause the first vehicle to overtake the second vehicle and return from the adjacent lane to the original lane.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 30 is a conceptual diagram of an overtaking schedule mode map according to one example embodiment of the disclosure.

DETAILED DESCRIPTION

Figure 1:
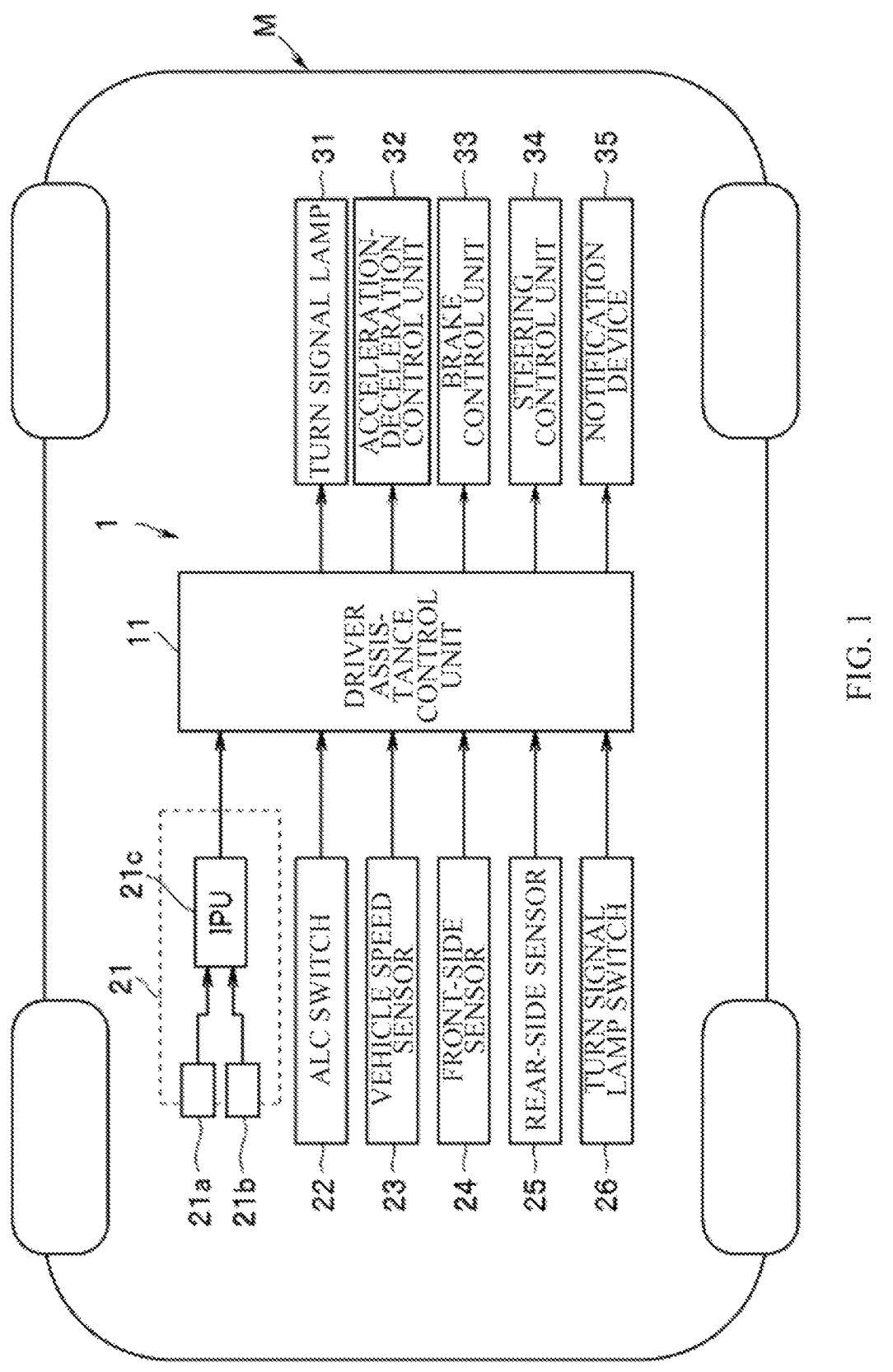
FIG. 1 is a block diagram illustrating a schematic configuration of a driver assistance apparatus according to one example embodiment of the disclosure.

In a case where an own vehicle is traveling following a preceding vehicle and where the preceding vehicle intends to decelerate or stop to turn right, for example, a driver who drives the own vehicle requests a control unit to perform an operation for overtaking the preceding vehicle in some cases.

In such a case, according to existing ALC control disclosed in JP-A No. 2016-71514, it is determined whether the own vehicle traveling on an original lane is allowed to make a lane change to an adjacent lane, that is, it is determined whether a vehicle traveling on the adjacent lane (herein after referred to as an adjacent-lane vehicle) has been detected. In a case where no vehicle has been detected on the adjacent lane and where it is determined that the own vehicle is allowed to make a lane change to the adjacent lane, the ALC control is started. To return the own vehicle to the original lane after the completion of the lane change to the adjacent lane, it is determined whether the own vehicle is allowed to make a lane change under the ALC control again, that is, it is determined whether the own vehicle is allowed to return to a position in front of the preceding vehicle on the original lane under the ALC control. If it is determined that the own vehicle is allowed to return to the original lane, the ALC control is started.

According to the existing ALC control described above, it is determined whether the lane change to the adjacent lane is allowable before the own vehicle overtakes the preceding vehicle. If it is determined that the lane change to the adjacent lane is allowable, first ALC control is executed. After the first ALC control is completed, it is determined whether the lane change to the original lane is allowable. If it is determined that the lane change to the original lane is allowable, second ALC control is executed. This makes the driver feel a time delay at a transition from the first ALC control to the second ALC control.

Further, according to the existing ALC control, if it is determined that the first ALC control is allowed to be performed, the first ALC control is executed. However, if it is determined that the second ALC control is not allowed to be performed due to the presence of an adjacent-lane vehicle, the lane change to the original lane is interrupted. This hinders the own vehicle from returning to the original lane, making the driver feel disappointed and uncomfortable.

It is desirable to provide a driver assistance apparatus that performs automatic overtaking control to achieve smooth overtaking based on relations of an own vehicle with a preceding vehicle and an adjacent-lane vehicle while preventing the driver from feeling a time delay or feeling uncomfortable.

An exemplary embodiment of the disclosure will now be described with reference to the accompanying drawings.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "contact" may be used interchangeably with the term "collision".

FIG. 1 illustrates an own vehicle M including a driver assistance apparatus 1. In one embodiment, the own vehicle M may serve as a "first vehicle". The driver assistance apparatus 1 may include a driver assistance control unit 11. The driver assistance control unit 11 may be a micro-controller that includes a CPU, a RAM, a ROM, a rewritable nonvolatile memory such as a flash memory or an EEPROM, and a peripheral device. In the ROM, a program or fixed data adapted to cause the CPU to execute various processes may be stored, for example. The RAM may be provided as a work area of the CPU, and may temporarily store various kinds of data to be used by the CPU. Note that the CPU may be also referred to as a micro-processing unit (MPU) or a processor. In place of the CPU, a graphics processing unit (GPU) or a graph streaming processor (GSP) may be used. Alternatively, a CPU, a GPU, and a GSP may be used in selective combination.

To an input side of the driver assistance control unit 11, a front recognition sensor 21, an ALC switch 22, a vehicle speed sensor 23, a front-side sensor 24, a rear-side sensor 25, and a turn signal lamp switch 26 may be coupled, for example. The ALC switch 22 may be turned on by a driver who drives the own vehicle M to select auto lane changing (ALC) control. The vehicle speed sensor 23 may serve as an own vehicle speed detector that detects a vehicle speed of the own vehicle M. The turn signal lamp switch 26 may be turned on by the driver to make a course change such as a lane change.

The front recognition sensor 21 may include a stereo camera that includes a main camera 21*a* and a sub-camera 21*b*, and an image processing unit (IPU) 21*c*. Images of a traveling environment in front of the own vehicle M captured by the main camera 21*a* and the sub-camera 21*b* may be subjected to predetermined image processing at the IPU 21*c*, and thereafter sent to the driver assistance control unit 11. Note that the stereo camera may be a mere example of a sensor that recognizes the front traveling environment. The front recognition sensor 21 may be a millimeter-wave radar, an acoustic radar, a light detection and ranging (LiDAR), or another sensor that recognizes the front traveling environment, instead of the stereo camera. Alternatively, the front recognition sensor 21 may include a combination of these sensors and a monocular camera. Still alternatively, the front recognition sensor 21 may be a monocular camera that detects a distance from the own vehicle M to an object.

The front-side sensor 24 and the rear-side sensor 25 may be each a camera, a millimeter-wave sensor, a micro-wave sensor, or a LiDAR, for example. The front-side sensor 24 may be disposed on each of right and left sides of a front bumper, and the rear-side sensor 25 may be disposed on each of right and left sides of a rear bumper. The front-side sensors 24 may monitor areas diagonally frontward right and diagonally frontward left that are difficult to recognize by the front recognition sensor 21 described above. The rear-side sensor 25 may monitor areas diagonally rearward right and diagonally rearward left that are difficult to recognize by the front recognition sensor 21 described above. In one embodiment, the front recognition sensor 21, the front-side sensor 24, and the rear-side sensor 25 may serve as an "environment information acquisition unit" that acquires information on a traveling environment surrounding the own vehicle M.

To an output side of the driver assistance control unit 11, a turn signal lamp 31, an acceleration-deceleration control unit 32, a brake control unit 33, a steering control unit 34, and a notification device 35 are coupled, for example. The turn signal lamp 31 may be turned on to notify people or vehicles present around the own vehicle M of the direction of a course change such as a lane change of the own vehicle M. The turn signal lamp 31 may be disposed on each of a front right side, a front left side, a rear right side, and a rear left side of the own vehicle M in a vehicle width direction.

The acceleration-deceleration control unit 32 may control outputs from a drive source such as an engine or an electric motor mounted on the own vehicle M. The brake control unit 33 may control a brake force generated at each wheel by adjusting a brake hydraulic pressure to be supplied to a brake wheel cylinder of each wheel. The steering control unit 34 may control steering torque to be generated by an electronic power steering (EPS) motor. The notification device 35 may be a monitor or a speaker, for example. When the driver assistance control unit 11 executes the ALC control, the notification device 35 may notify the driver of the execution of the ALC control.

Based on the information on the front traveling environment recognized by the front recognition sensor 21, the driver assistance control unit 11 may acquire information on a preceding vehicle A traveling immediately in front of the own vehicle M on the same lane as the own vehicle M, and information on an adjacent-lane vehicle B traveling in front of the own vehicle M on an adjacent lane. In one embodiment, the preceding vehicle A may serve as a "second vehicle". In one embodiment, the adjacent-lane vehicle B may serve as a "third vehicle". The information on the preceding vehicle A and the information on the adjacent-lane vehicle B may be each information on a distance to the own vehicle M or a relative vehicle speed to the own vehicle M, for example.

Based on the information detected by the front-side sensor 24 and the rear-side sensor 25, the driver assistance control unit 11 may acquire information on the adjacent-lane vehicle B traveling in front of, behind, or in parallel to the own vehicle M on the adjacent lane. The information on the adjacent-lane vehicle B may be data on the distance to the own vehicle M or the relative vehicle speed to the own vehicle M, for example. In the example embodiment, the description is made provided that the subject vehicles travel on a road where drivers keep to the right by law. Needless to say, left and right settings or the like may be set in an opposite manner if the subject vehicles travel on a road where drivers keep to the left by law.

The driver assistance control unit 11 performs overtaking control in which first ALC control adapted to move the own vehicle M to the adjacent lane and second ALC control adapted to return the own vehicle M to the original lane are executed in sequence. To automatically perform the overtaking control, the driver assistance control unit 11 generates an overtaking schedule based on relations of the own vehicle M with the preceding vehicle A and the adjacent-lane vehicle B before the first ALC control is started. The driver assistance control unit 11 executes the first ALC control and the second ALC control in accordance with the overtaking schedule.

Figure 2:
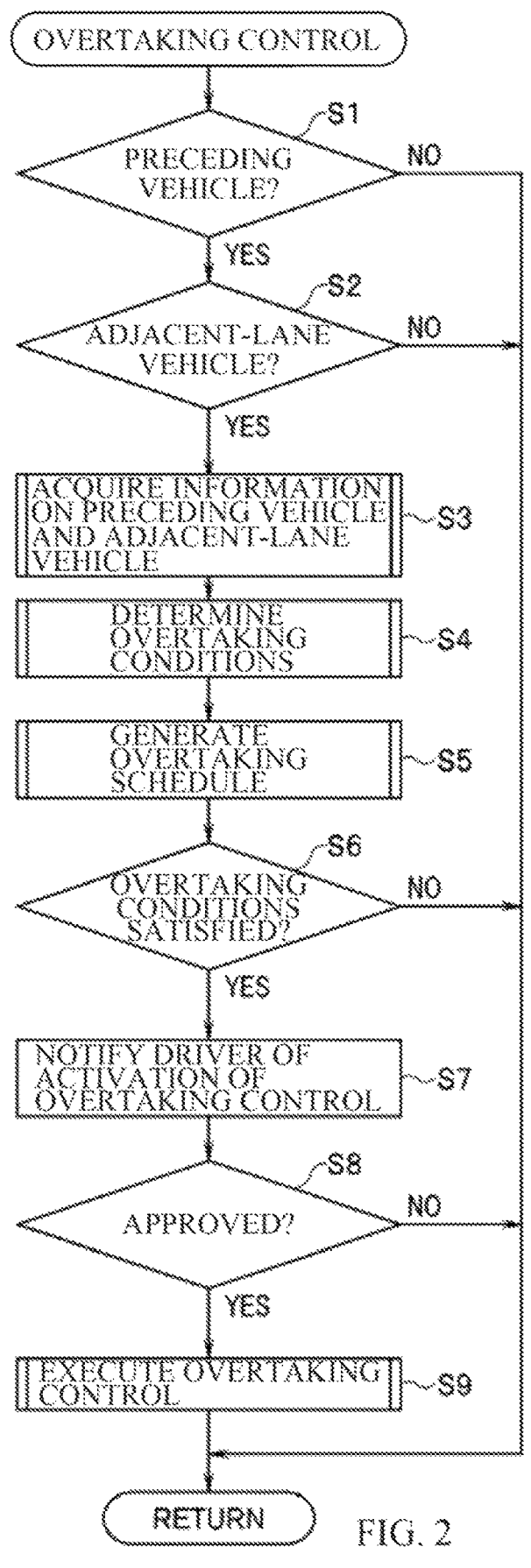
FIG. 2 is a flowchart of a routine of overtaking control according to one example embodiment of the disclosure.

The driver assistance control unit 11 may generate the overtaking schedule and execute the overtaking control in accordance with an exemplary flow of a routine of the overtaking control illustrated in FIG. 2. In one embodiment, the driver assistance control unit 11 may serve as an "overtaking control processor". The driver assistance control unit 11 may perform the routine illustrated in FIG. 2 as a process performed by the overtaking control processor.

The routine may be repeatedly executed after an overtaking control system of the driver assistance control unit 11 is activated. First, in Step S1, the driver assistance control unit 11 may determine whether the preceding vehicle A traveling immediately in front of the own vehicle M has been detected on the same lane as the own vehicle M based on the information on the front traveling environment acquired by the front recognition sensor 21. If the preceding vehicle A has been detected (Step S1: YES), the flow may proceed to Step S2. In contrast, if the preceding vehicle A has not been detected (Step S1: NO), the flow may exit the routine.

In Step S2, the driver assistance control unit 11 may determine whether the adjacent-lane vehicle B has been detected based on the information detected by the front-side sensor 24 and the rear-side sensor 25. If the adjacent-lane vehicle B has been detected (Step S2: YES), the flow may proceed to Step S3. In contrast, if the adjacent-lane vehicle B has not been detected (Step S2: NO), the flow may exit the routine.

In Step S3, the driver assistance control unit 11 may acquire the information on the preceding vehicle A and the information on the adjacent-lane vehicle B, following which the flow may proceed to Step S4. In Step S4, the driver assistance control unit 11 may determine overtaking conditions, following which the flow may proceed to Step S5. In Step S5, the driver assistance control unit 11 may generate the overtaking schedule, following which the flow may proceed to Step S6. In the example embodiment, the driver assistance control unit 11, which serves as as the overtaking control processor, includes an overtaking schedule generator. The driver assistance control unit 11 may perform the process at Step S5 as a process performed by the overtaking schedule generator.

[Acquisition of Information on Preceding Vehicle and Information on Adjacent-Lane Vehicle]

Figure 3:
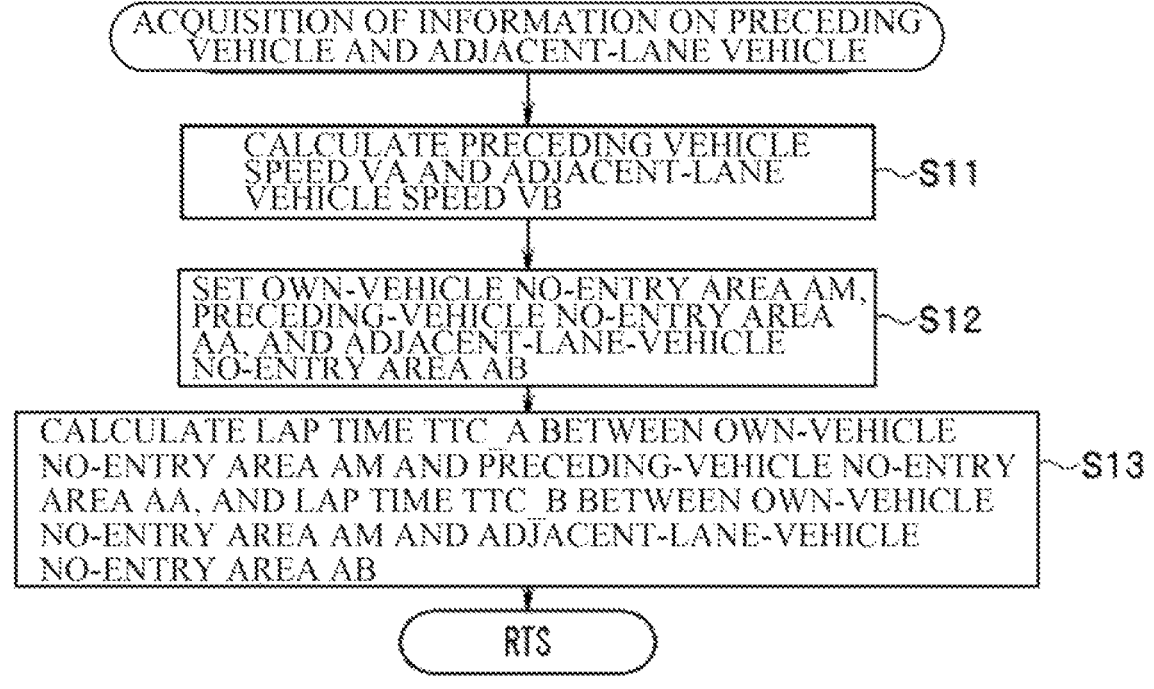
FIG. 3 is a flowchart of a sub-routine of acquiring information on a preceding vehicle and an adjacent-lane vehicle according to one example embodiment of the disclosure.

The process adapted to acquire the information on the preceding vehicle A and the information on the adjacent-lane vehicle B at Step S3 may be performed in accordance with a sub-routine illustrated in FIG. 3. The sub-routine illustrated in FIG. 3 may start with Step S11 in which the driver assistance control unit 11 calculates a vehicle speed VA of the preceding vehicle A (hereinafter also referred to as a preceding vehicle speed VA) and a vehicle speed VB of the adjacent-lane vehicle B (hereinafter also referred to as an adjacent-lane vehicle speed VB). The preceding vehicle speed VA may be calculated based on a vehicle speed VM of the own vehicle M (hereinafter also referred to as an own vehicle speed VM) detected by the vehicle speed sensor 23 and a change in an inter-vehicular distance between the own vehicle M and the preceding vehicle A detected based on the information on the front traveling environment acquired by the front recognition sensor 21.

The adjacent-lane vehicle speed VB may be calculated based on the own vehicle speed VM and a change in an inter-vehicular distance in the traveling direction between the own vehicle M and the adjacent-lane vehicle B detected by the front-side sensor 24 or the rear-side sensor 25. The preceding vehicle speed VA and the adjacent-lane vehicle speed VB may be acquired by inter-vehicular communication with the preceding vehicle A and the adjacent-lane vehicle B.

Thereafter, in Step S12, the driver assistance control unit 11 may set a no-entry area AM of the own vehicle M (hereinafter, also referred to as "own-vehicle no-entry area AM"), a no-entry area AA of the preceding vehicle A (hereinafter, also referred to as "preceding-vehicle no-entry area AA"), and a no-entry area AB of the adjacent-lane vehicle B (hereinafter, also referred to as "adjacent-lane-vehicle no-entry area AB"). In the example embodiment, the driver assistance control unit 11, which serves as the overtaking control processor, may include a no-entry area setting unit for the own vehicle M, a no-entry area setting unit for the preceding vehicle A, and a no-entry area setting unit for the adjacent-lane vehicle B. The driver assistance control unit 11 may perform the process at Step S12 as a process performed by the no-entry area setting unit for the own vehicle M, the no-entry area setting unit for the preceding vehicle A, and the no-entry area setting unit for the adjacent-lane vehicle B. In one embodiment, the own-vehicle no-entry area AM may serve as a "first-vehicle no-entry area". In one embodiment, the preceding-vehicle no-entry area AA may serve as a "second-vehicle no-entry area". In one embodiment, the adjacent-lane-vehicle no-entry area AB may serve as a "third-vehicle no-entry area". In one embodiment, the no-entry area setting unit for the own vehicle M may serve as a "first-vehicle no-entry area setting unit". In one embodiment, the no-entry area setting unit for the preceding vehicle A may serve as a "second-vehicle no-entry area setting unit". In one embodiment, the no-entry area setting unit for the adjacent-lane vehicle B may serve as a "third-vehicle no-entry area setting unit".

Figure 11:
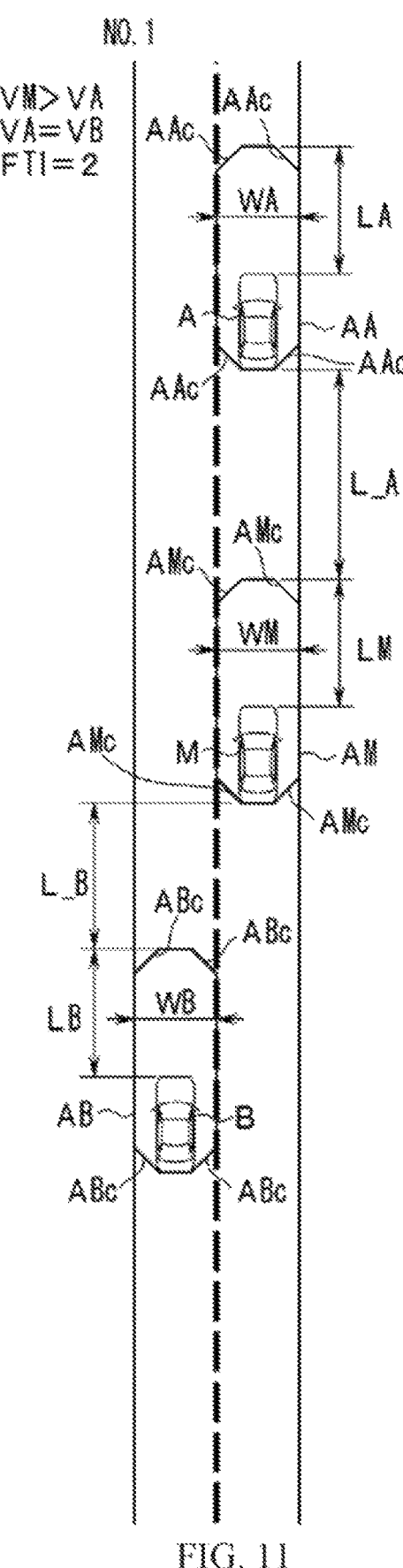
FIG. 11 is an explanatory diagram illustrating an initial position in a first overtaking mode of an overtaking schedule according to one example embodiment of the disclosure.
Figure 12:
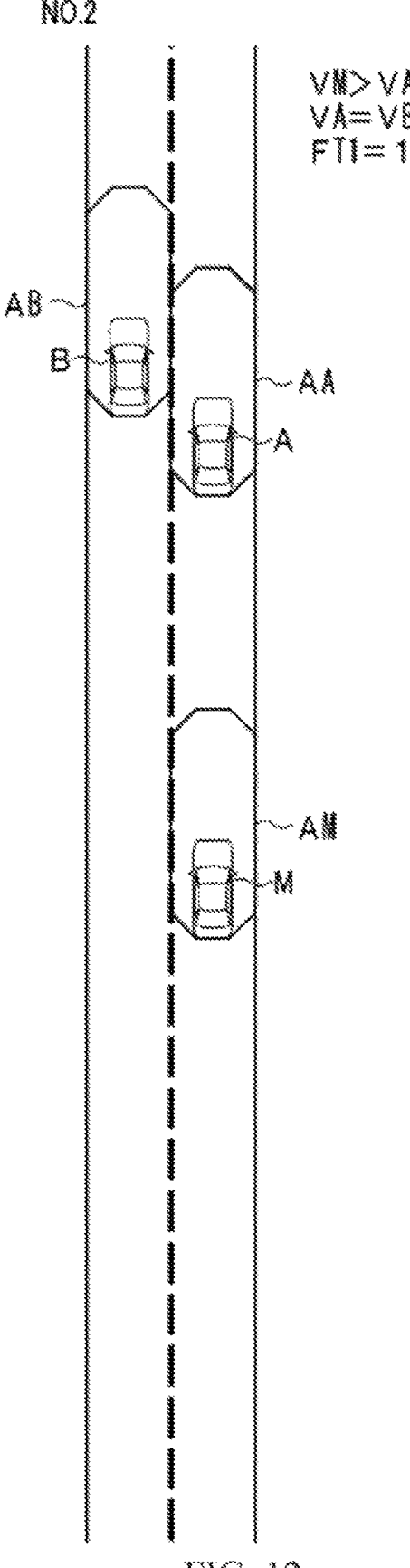
FIG. 12 is an explanatory diagram illustrating an initial position in a second overtaking mode of the overtaking schedule according to one example embodiment of the disclosure.

As illustrated in FIG. 11, the own-vehicle no-entry area AM may indicate a limit of approach of the preceding vehicle A and the adjacent-lane vehicle B to the own vehicle M, the preceding-vehicle no-entry area AA may indicate a limit of approach of the own vehicle M and the adjacent-lane vehicle B to the preceding vehicle A, and the adjacent-lane-vehicle no-entry area AB may indicate a limit of approach of the own vehicle M and the preceding vehicle A to the adjacent-lane vehicle B. That is, the own-vehicle no-entry area AM, the preceding-vehicle no-entry area AA, and the adjacent-lane-vehicle no-entry area AB may be each an area that another vehicle is prohibited from entering during automatic driving. The own-vehicle no-entry area AM, the preceding-vehicle no-entry area AA, and the adjacent-lane-vehicle no-entry area AB may have respective widths WM, WA, and WB. The widths WM, WA, and WB may be traveling lane widths each of which is defined between right and left lane dividing lines. These traveling lane widths may be acquired based on the information received from the vehicle speed sensor 23, the front-side sensor 24, and the rear-side sensor 25. Alternatively, the traveling lane widths may be retrieved from high resolution road map data read upon the automatic driving.

A rear edge of the own-vehicle no-entry area AM may be set at a rear end of the own vehicle M, a rear edge of the preceding-vehicle no-entry area AA may be set at a rear end of the preceding vehicle A, and a rear edge of the adjacent-lane-vehicle no-entry area AB may be set at a rear end of the adjacent-lane vehicle B. In addition, a frontal distance LM from a front end of the own vehicle M to a front edge of the own-vehicle no-entry area AM may be determined based on the own vehicle speed VM currently detected, and first time-to-contact (TTC) set as safety time. A frontal distance LA from a front end of the preceding vehicle A to a front edge of the preceding-vehicle no-entry area AA may be determined based on the preceding vehicle speed VA currently detected, and the first TTC. A frontal distance LB from a front end of the adjacent-lane vehicle B to a front edge of the adjacent-lane-vehicle no-entry area AB may be determined based on the adjacent-lane vehicle speed VB currently detected, and the first TTC. In the example embodiment, the first TTC may be set to, but not limited to, three seconds. Note that the TTC may be calculated by dividing the distance by the vehicle speed.

For example, in a case where the own vehicle speed VM, the preceding vehicle speed VA, and the adjacent-lane vehicle speed VB are each 60 kilometers per hour and the TTC is three seconds, the frontal distances LM, LA, and LB may be each 50 meters. A longitudinal length of the own-vehicle no-entry area AM may be calculated by adding the entire length of the own vehicle M to the frontal distance LM, a longitudinal length of the preceding-vehicle no-entry area AA may be calculated by adding the entire length of the preceding vehicle A to the frontal distance LA, and a longitudinal length of the own-vehicle no-entry area AM may be calculated by adding the entire length of the adjacent-lane vehicle B to the frontal distance LB. Note that the entire length of the own vehicle M may be a fixed value set in advance. The entire length of the preceding vehicle A and the entire length of the adjacent-lane vehicle B may be each a fixed value such as 6 meters, or may be estimated from the width and height of the vehicle.

As illustrated in FIG. 11, the own-vehicle no-entry area AM may have cut portions AMc provided on respective four corners thereof, the preceding-vehicle no-entry area AA may have cut portions AAc provided on respective four corners thereof, and the adjacent-lane-vehicle no-entry area AB may have cut portions ABc provided on respective four corners thereof. The cut portions AMc, AAc, and ABc may each correspond to second TTC which may be one second. At the cut portions AMc of the own-vehicle no-entry area AM, the own-vehicle no-entry area AM may be allowed to overlap with the preceding-vehicle no-entry area AA or the adjacent-lane-vehicle no-entry area AB during a lane change of the own vehicle M. At the cut portions AAc of the preceding-vehicle no-entry area AA, the preceding-vehicle no-entry area AA may be allowed to overlap with the own-vehicle no-entry area AM or the adjacent-lane-vehicle no-entry area AB during a lane change of the preceding vehicle A. At the cut portions ABc of the adjacent-lane-vehicle no-entry area AB, the adjacent-lane-vehicle no-entry area AB may be allowed to overlap with the own-vehicle no-entry area AM or the preceding-vehicle no-entry area AA during a lane change of the adjacent-lane vehicle B.

Thereafter, in Step S13, the driver assistance control unit 11 may calculate lap time TTC_A to overlapping of the own-vehicle no-entry area AM with the preceding-vehicle no-entry area AA based on an interval area distance L_A between the own-vehicle no-entry area AM and the preceding-vehicle no-entry area AA and a relative vehicle speed between the own vehicle speed VM and the preceding vehicle speed VA. In addition, the driver assistance control unit 11 may calculate lap time TTC_B to overlapping of the own-vehicle no-entry area AM with the adjacent-lane-vehicle no-entry area AB based on an interval area distance L_B in the traveling direction between the own-vehicle no-entry area AM and the adjacent-lane-vehicle no-entry area AB and a relative vehicle speed between the own vehicle speed VM and the adjacent-lane vehicle speed VB. Thereafter, the flow may proceed to Step S4 in FIG. 2.

[Determination of Overtaking Conditions]

When the flow proceeds to Step S4 in FIG. 2, the driver assistance control unit 11 may determine overtaking conditions. As the overtaking conditions, the driver assistance control unit 11 may estimate positional relations between the own vehicle M and the preceding vehicle A at the time of the first ALC control and the second ALC control, and positional relation between the own vehicle M and the adjacent-lane vehicle B at the time of the first ALC control and the second ALC control, based on the relative vehicle speed and the positional relation between the own vehicle M and the preceding vehicle A at the time before the start of the first ALC control, and the relative vehicle speed and the positional relation between the own vehicle M and the adjacent-lane vehicle B at the time before the start of the first ALC control.

Figure 4:
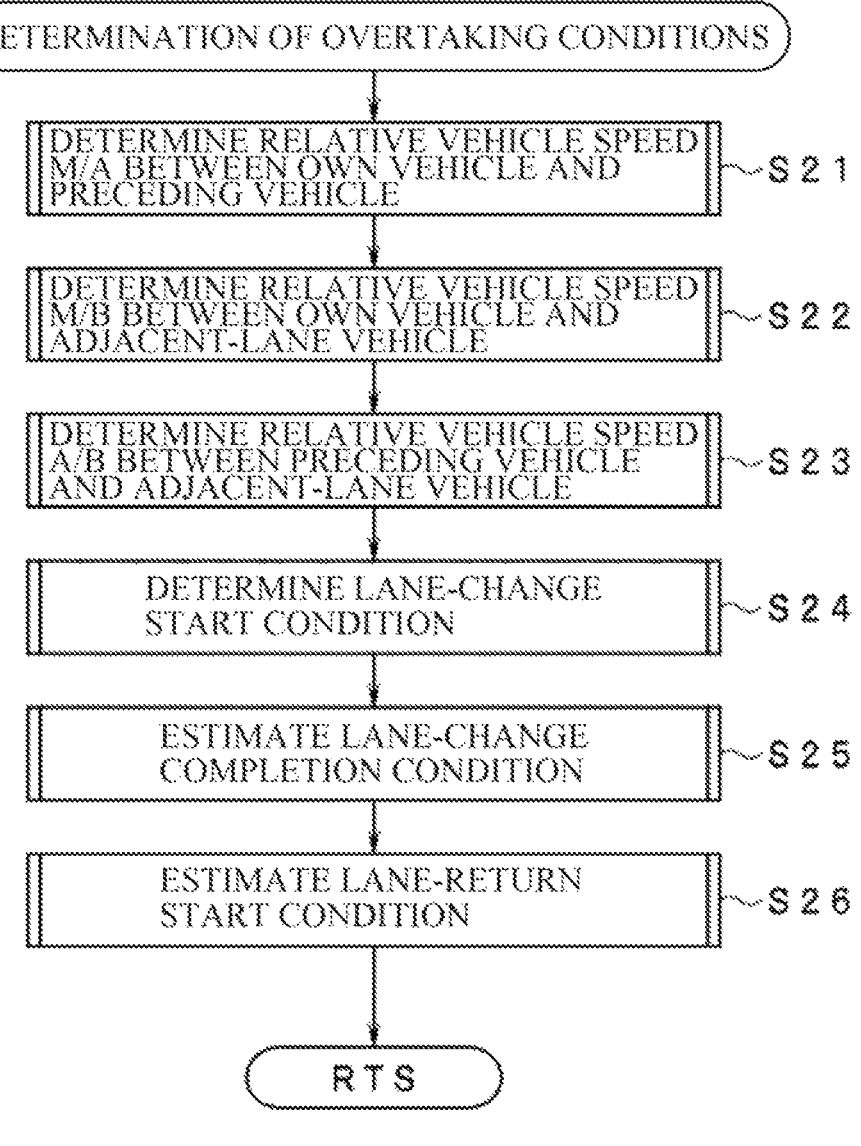
FIG. 4 is a flowchart of a sub-routine of determining overtaking conditions according to one example embodiment of the disclosure.

The determination of the overtaking conditions may be executed in accordance with a sub-routine illustrated in FIG. 4. The sub-routine illustrated in FIG. 4 may start with Step S21 in which the driver assistance control unit 11 determines a relative vehicle speed M/A between the own vehicle M and the preceding vehicle A. The determination of the relative vehicle speed M/A may be performed in accordance with a sub-routine illustrated in FIG. 5.

Figure 5:
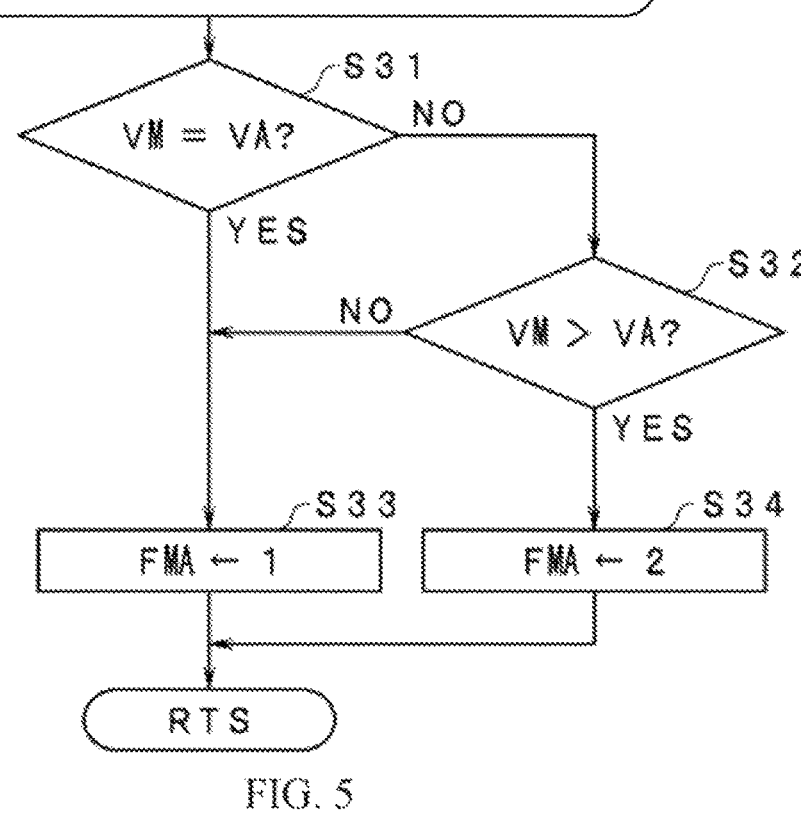
FIG. 5 is a flowchart of a sub-routine of determining a relative vehicle speed between an own vehicle and the preceding vehicle according to one example embodiment of the disclosure.

In the sub-routine illustrated in FIG. 5, the driver assistance control unit 11 may compare the own vehicle speed VM with the preceding vehicle speed VA in Steps S31 and S32. If the own vehicle speed VM is equal to the preceding vehicle speed VA (VM=VA) (Step S31: YES), or if the own vehicle speed VM is not equal to the preceding vehicle speed VA (Step S31: NO) and is lower than the preceding vehicle speed VA (VM<VA) (Step S32: NO), the driver assistance control unit 11 may determine that the own vehicle M is not to overtake the preceding vehicle A, following which the flow may proceed to Step S33. In contrast, if the own vehicle speed VM is higher than the preceding vehicle speed VA (VM>VA) (Step S32: YES), the driver assistance control unit 11 may determine that there is a possibility that the own vehicle M will overtake the preceding vehicle A, following which the flow may proceed to Step S34.

In Step S33, the driver assistance control unit 11 may set a flag FMA of the relative vehicle speed M/A to 1 (FMA←1), following which the flow may proceed to Step S22 in FIG. 4. In Step S34, the driver assistance control unit 11 may set the flag FMA of the relative vehicle speed M/A to 2 (FMA←2), following which the flow may proceed to Step S22 in FIG. 4.

In Step S22 in FIG. 4, the driver assistance control unit 11 may determine a relative vehicle speed M/B between the own vehicle M and the adjacent-lane vehicle B. The determination of the relative vehicle speed M/B may be performed in accordance with a sub-routine illustrated in FIG. 6.

Figure 6:
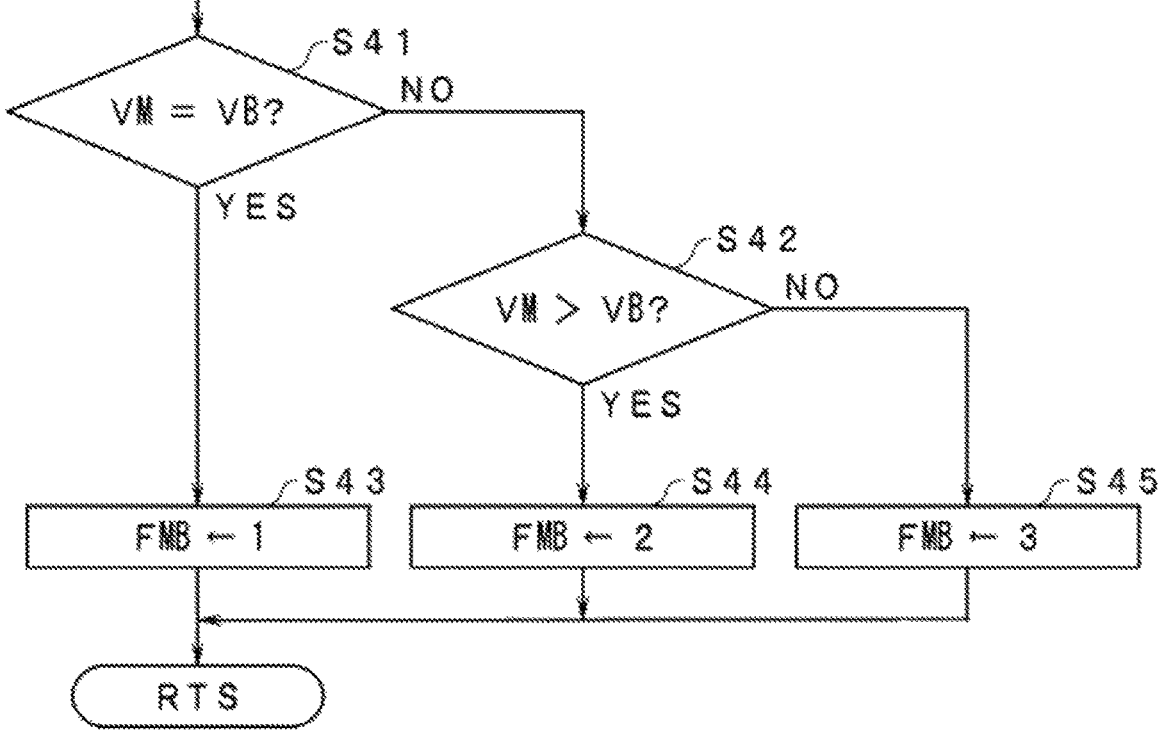
FIG. 6 is a flowchart of a sub-routine of determining a relative vehicle speed between the own vehicle and the adjacent-lane vehicle according to one example embodiment of the disclosure.

In the sub-routine illustrated in FIG. 6, the driver assistance control unit 11 may first compare the own vehicle speed VM with the adjacent-lane vehicle speed VB in Steps S41 and S42. If the own vehicle speed VM is equal to the adjacent-lane vehicle speed VB (VM=VB) (Step S41: YES), the flow may proceed to Step S43. If the own vehicle speed VM is higher than the adjacent-lane vehicle speed VB (VM>VB) (Step S42: YES), the flow may proceed to Step S44. In contrast, if the own vehicle speed VM is lower than the adjacent-lane vehicle speed VB (VM<VB) (Step S42: NO), the flow may proceed to Step S45.

In Step S43, the driver assistance control unit 11 may set a flag FMB of the relative vehicle speed M/B to 1 (FMB←1), following which the flow may proceed to Step S23 in FIG. 4. In Step S44, the driver assistance control unit 11 may set the flag FMB of the relative vehicle speed M/B to 2 (FMB←2), following which the flow may proceed to Step S23 in FIG. 4. In Step S45, the driver assistance control unit 11 may set the flag FMB of the relative vehicle speed M/B to 3 (FMB←3), following which the flow may proceed to Step S23 in FIG. 4.

In Step S23 in FIG. 4, the driver assistance control unit 11 may determine a relative speed A/B between the preceding vehicle A and the adjacent-lane vehicle B. The determination of the relative speed A/B may be performed in accordance with a sub-routine illustrated in FIG. 7.

Figure 7:
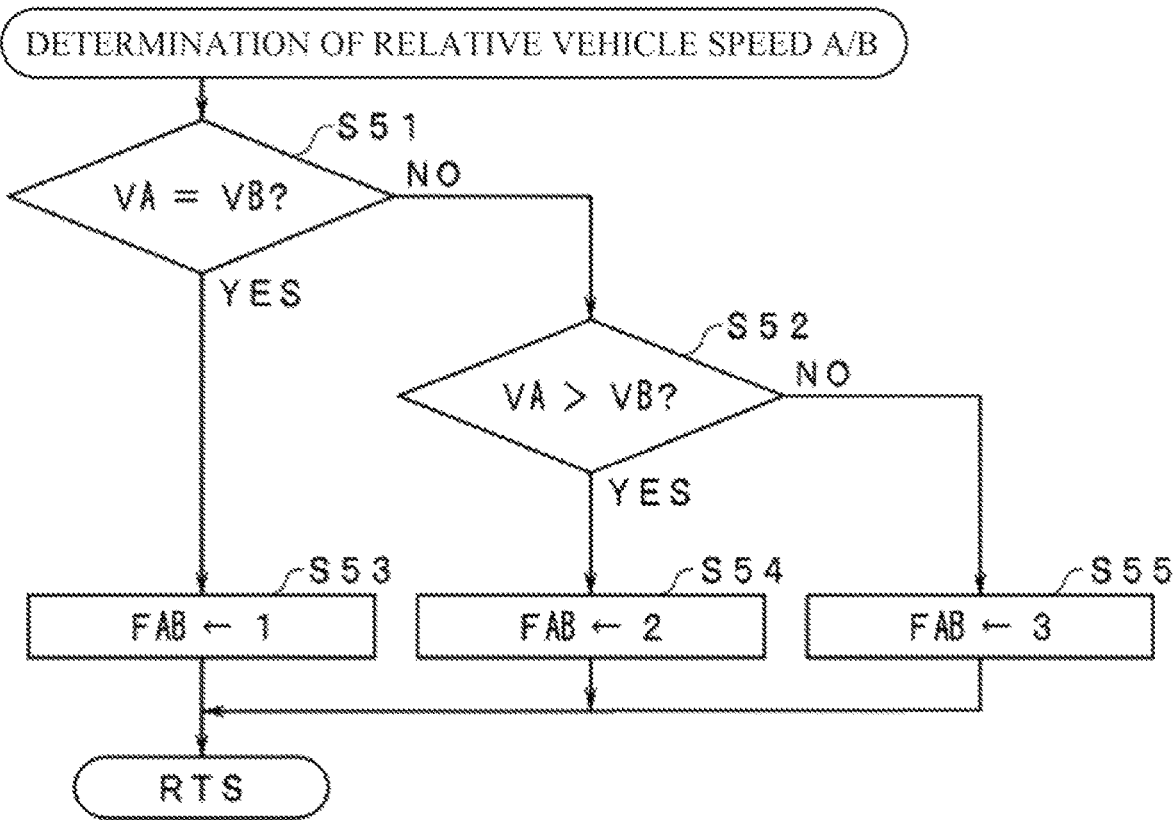
FIG. 7 is a flowchart of a sub-routine of determining a relative vehicle speed between the preceding vehicle and the adjacent-lane vehicle according to one example embodiment of the disclosure.

In the sub-routine illustrated in FIG. 7, the driver assistance control unit 11 may first compare the preceding vehicle speed VA with the adjacent-lane vehicle speed VB in Steps S51 and S52. If the preceding vehicle speed VA is equal to the adjacent-lane vehicle speed VB (VA=VB) (Step S51: YES), the flow may proceed to Step S53. If the preceding vehicle speed VA is higher than the adjacent-lane vehicle speed VB (VA>VB) (Step S52: YES), the flow may proceed to Step S54. In contrast, if the preceding vehicle speed VA is lower than the adjacent-lane vehicle speed VB (VA<VB) (Step S52: NO), the flow may proceed to Step S55.

In Step S53, the driver assistance control unit 11 may set a flag FAB of the relative vehicle speed A/B to 1 (FAB←1), following which the flow may proceed to Step S24 in FIG. 4. In Step S54, the driver assistance control unit 11 may set the flag FAB of the relative vehicle speed A/B to 2 (FAB←2), following which the flow may proceed to Step S24 in FIG. 4. In Step S55, the driver assistance control unit 11 may set the flag FAB of the relative vehicle speed A/B to 3 (FAB<−3), following which the flow may proceed to Step S24 in FIG. 4.

In the subsequent Steps S24 to S26 in FIG. 4, the driver assistance control unit 11 may determine conditions necessary to generate the overtaking schedule for starting a lane change of the own vehicle M, causing the own vehicle M to overtake the preceding vehicle A, and returning the own vehicle M to a position in front of the preceding vehicle A on the original lane under the ALC control by the driver assistance control unit 11.

The driver assistance control unit 11 may execute the first ALC control and the second ALC control in accordance with the overtaking schedule generated in advance. To execute the first ALC control, the driver assistance control unit 11 may first turn on the turn signal lamp 31 on a lane change side, and cause the own vehicle M to travel following the preceding vehicle A for three seconds.

After the own vehicle M travels following the preceding vehicle A for three seconds, the driver assistance control unit 11 may perform the first ALC control to start a lane change of the own vehicle M to the adjacent lane. The lane change may be completed in five seconds. The lane change by the first ALC control may start at least before the cut portions AMc on the front edge of the own-vehicle no-entry area AM overlap with the cut portions AAc on the rear edge of the preceding-vehicle no-entry area AA.

Thereafter, the driver assistance control unit 11 may cause the own vehicle M to keep traveling on the adjacent lane until the cut portions AMc on the rear edge of the own-vehicle no-entry area AM pass by a position where the cut portions AMc overlap with the respective cut portions AAc on the front edge of the preceding-vehicle no-entry area AA in the traveling direction. After the cut portions AMc on the rear edge of the own-vehicle no-entry area AM pass by the position where the cut portions AMc overlap with the respective cut portions AAc on the front edge of the preceding-vehicle no-entry area AA, the driver assistance control unit 11 may start the second ALC control to return the own vehicle M to a position in front of the preceding vehicle A on the original lane.

When starting the lane change in the second ALC control, the driver assistance control unit 11 may turn on the turn signal lamp 31 on an original lane side three seconds before returning to the original lane. After the lane change of the own vehicle M to the position in front of the preceding vehicle A is completed, the driver assistance control unit 11 may end the second ALC control.

In Step S24, the driver assistance control unit 11 may determine a lane-change start condition for starting the first ALC control. The determination of the lane-change start condition may be performed in accordance with a sub-routine illustrated in FIG. 8.

Figure 8:
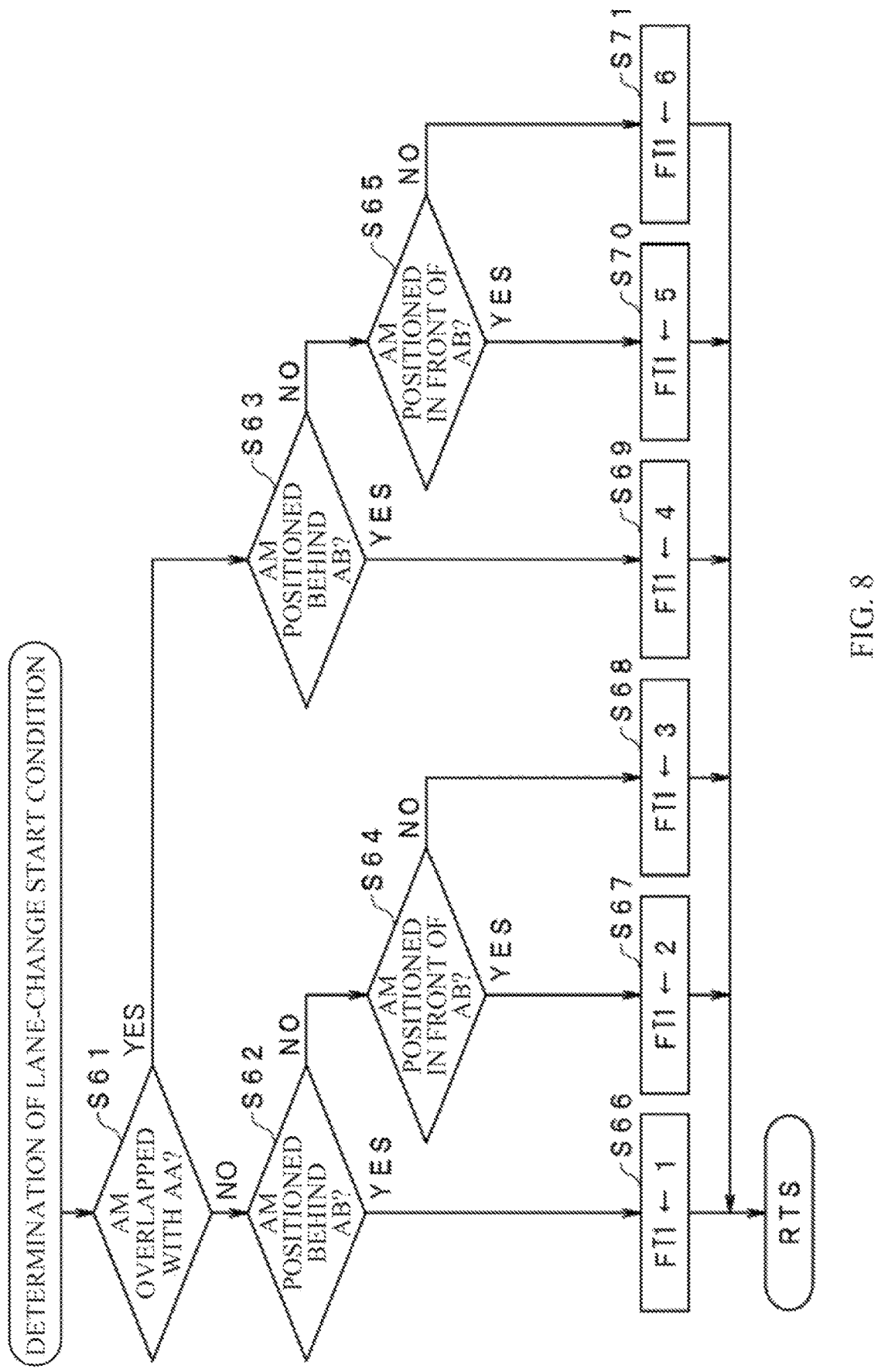
FIG. 8 is a flowchart of a sub-routine of estimating a lane-change start condition according to one example embodiment of the disclosure.

In the sub-routine illustrated in FIG. 8, the driver assistance control unit 11 may determine a positional relation between the own-vehicle no-entry area AM and the preceding-vehicle no-entry area AA at the time before the start of the first ALC control and a positional relation between the own-vehicle no-entry area AM and the adjacent-lane-vehicle no-entry area AB at the time before the start of the first ALC control. First, in Step S61, the driver assistance control unit 11 may determine whether the own-vehicle no-entry area AM overlaps with the rear portion of the preceding-vehicle no-entry area AA. If it is not determined that the own-vehicle no-entry area AM overlaps with the preceding-vehicle no-entry area AA (Step S61: NO), the flow may proceed to Step S62. In contrast, if it is determined that the own-vehicle no-entry area AM overlaps with the preceding-vehicle no-entry area AA (Step S61: YES), the flow may branch to Step S63.

In Step S62, the driver assistance control unit 11 may determine the positional relation between the own-vehicle no-entry area AM and the adjacent-lane-vehicle no-entry area AB in the vehicle traveling direction in Steps S62 and S64. If it is determined that the own-vehicle no-entry area AM is positioned behind the adjacent-lane-vehicle no-entry area AB (Step S62: YES), the flow may proceed to Step S66. If it is determined that the own-vehicle no-entry area AM is positioned in front of the adjacent-lane-vehicle no-entry area AB (Step S62: NO and Step S64: YES), the flow may proceed to Step S67. If it is determined that at least a part of the own-vehicle no-entry area AM overlaps with the adjacent-lane-vehicle no-entry area AB (Step S64: NO), the flow may proceed to Step S68.

In Step S66, the driver assistance control unit 11 may set a flag FT1 of the lane-change start condition to 1 (FT1←1), following which the flow may proceed to Step S25 in FIG. 4. In Step S67, the driver assistance control unit 11 may set the flag FT1 of the lane-change start condition to 2 (FT1←2), following which the flow may proceed to Step S25 in FIG. 4. In Step S68, the driver assistance control unit 11 may set the flag FT1 of the lane-change start condition to 3 (FT1 3), following which the flow may proceed to Step S25 in FIG. 4.

In contrast, if the flow branches from the Step S61 to Step S63, the driver assistance control unit 11 may determine the positional relation between the own-vehicle no-entry area AM and the adjacent-lane-vehicle no-entry area AB in the vehicle traveling direction in Steps S63 and S65. If it is determined that the own-vehicle no-entry area AM is positioned behind the adjacent-lane-vehicle no-entry area AB (Step S63: YES), the flow may proceed to Step S69. In contrast, if it is determined that the no-entry area AM of the own vehicle M is positioned in front of the adjacent-lane-vehicle no-entry area AB (Step S63: NO and Step S65: YES), the flow may proceed to Step S70. If at least a part of the own-vehicle no-entry area AM overlaps with the adjacent-lane-vehicle no-entry area AB (Step S65: NO), the flow may proceed to Step S71.

In Step S69, the driver assistance control unit 11 may set the flag FT1 of the lane-change start condition to 4 (FT1←4), following which the flow may proceed to Step S25 in FIG. 4. In Step S70, the driver assistance control unit 11 may set the flag FT1 of the lane-change start condition to 5 (FT1←5), following which the flow may proceed to Step S25 in FIG. 4. In Step S71, the driver assistance control unit 11 may set the flag FT1 of the lane-change start condition to 6 (FT1←6), following which the flow may proceed to Step S25 in FIG. 4. That is, when the flag FT1 of the lane-change start condition is set to 6 (FT1←6), the front edge of the own-vehicle no-entry area AM may overlap with the preceding-vehicle no-entry area AA, and the rear edge of the own-vehicle no-entry area AM overlaps with the adjacent-lane-vehicle no-entry area AB.

In Step S25 in FIG. 4, the driver assistance control unit 11 may estimate a lane-change completion condition, that is, the driver assistance control unit 11 may estimate a positional relation between the own-vehicle no-entry area AM and the adjacent-lane-vehicle no-entry area AB at the time after the completion of the lane change of the own vehicle M by the first ALC control based on the own vehicle speed VM, the adjacent-lane vehicle speed VB, and the positional relation between the own-vehicle no-entry area AM and the adjacent-lane-vehicle no-entry area AB at the time before the start of the first ALC control. The estimation of the lane-change completion condition may be performed in accordance with a sub-routine illustrated in FIG. 9. Note that, in the example embodiment, the lane change may be completed in five seconds, as described above.

Figure 9:
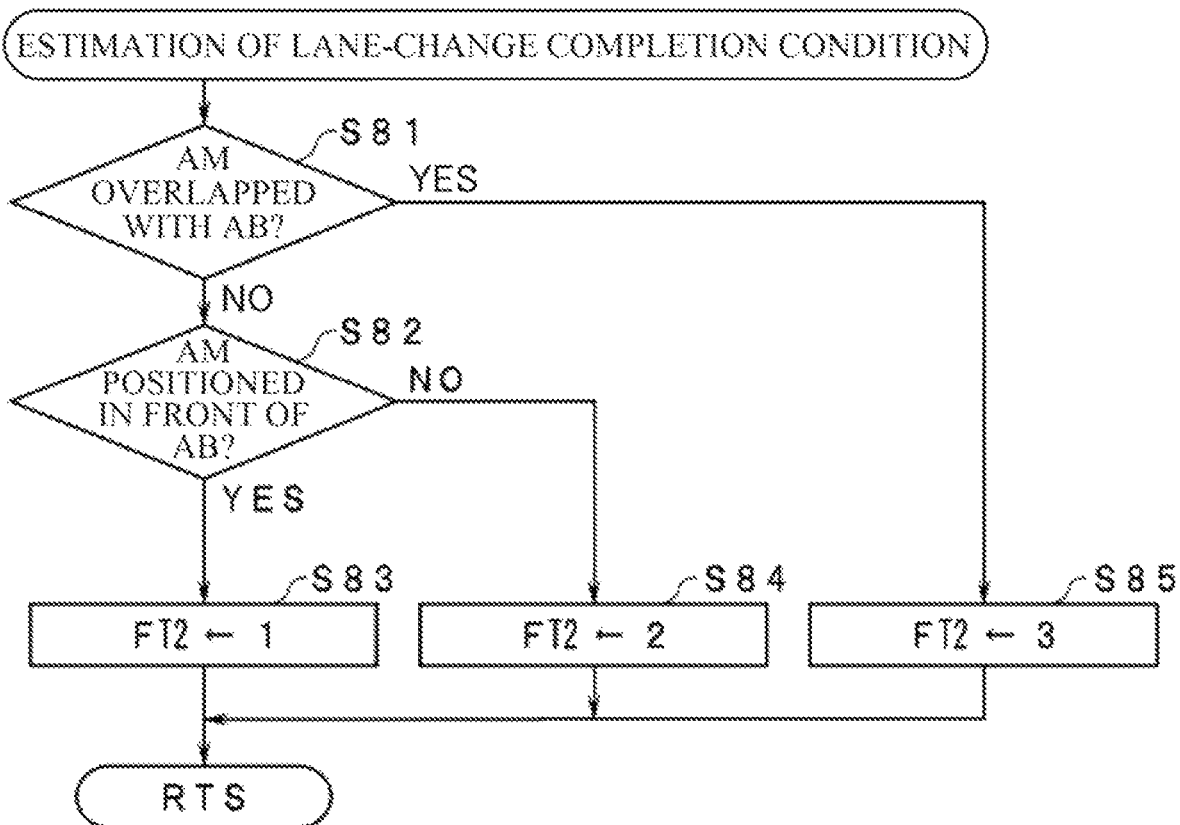
FIG. 9 is a flowchart of a sub-routine of estimating a lane-change completion condition according to one example embodiment of the disclosure.

In the sub-routine illustrated in FIG. 9, the driver assistance control unit 11 may first estimate whether the own-vehicle no-entry area AM will overlap with the adjacent-lane-vehicle no-entry area AB (Step S81). If it is not estimated that the own-vehicle no-entry area AM will overlap with the adjacent-lane-vehicle no-entry area AB (Step S81: NO), the flow may proceed to Step S82. If it is estimated that the own-vehicle no-entry area AM will overlap with the adjacent-lane-vehicle no-entry area AB (Step S81: YES), the flow may branch to Step S85.

In Step S82, the driver assistance control unit 11 may estimate whether the own-vehicle no-entry area AM will be positioned in front of the adjacent-lane-vehicle no-entry area AB. If it is estimated that the own-vehicle no-entry area AM will be positioned in front of the adjacent-lane-vehicle no-entry area AB (Step S82: YES), the flow may proceed to Step S83. In contrast, if it is estimated that the own-vehicle no-entry area AM will be positioned behind the adjacent-lane-vehicle no-entry area AB (Step S82: NO), the flow may branch to Step S84.

In Step S83, the driver assistance control unit 11 may set a flag FT2 of the lane-change completion condition to 1 (FT2←1), following which the flow may proceed to Step S26 in FIG. 4. In Step S84, the driver assistance control unit 11 may set the flag FT2 of the lane-change completion condition to 2 (FT2←2), following which the flow may proceed to Step S26 in FIG. 4. In Step S85, the driver assistance control unit 11 may set the flag FT2 of the lane-change completion condition to 3 (FT2←3), following which the flow may proceed to Step S26 in FIG. 4.

In Step S26, the driver assistance control unit 11 may estimate a lane-return start condition, that is, the driver assistance control unit 11 may estimate positional relations of the own vehicle M with the preceding vehicle A and the adjacent-lane vehicle B based on the relative vehicle speeds M/A, M/B, and A/B detected in Steps S21 to S23. As described above, the driver assistance control unit 11 may start returning the own vehicle M to the original lane by the second ALC control after the cut portions AMc on the rear edge of the own-vehicle no-entry area AM pass by the position where the cut portions AMc overlap with the cut portions AAc on the front edge of the preceding-vehicle no-entry area AA.

Figure 10:
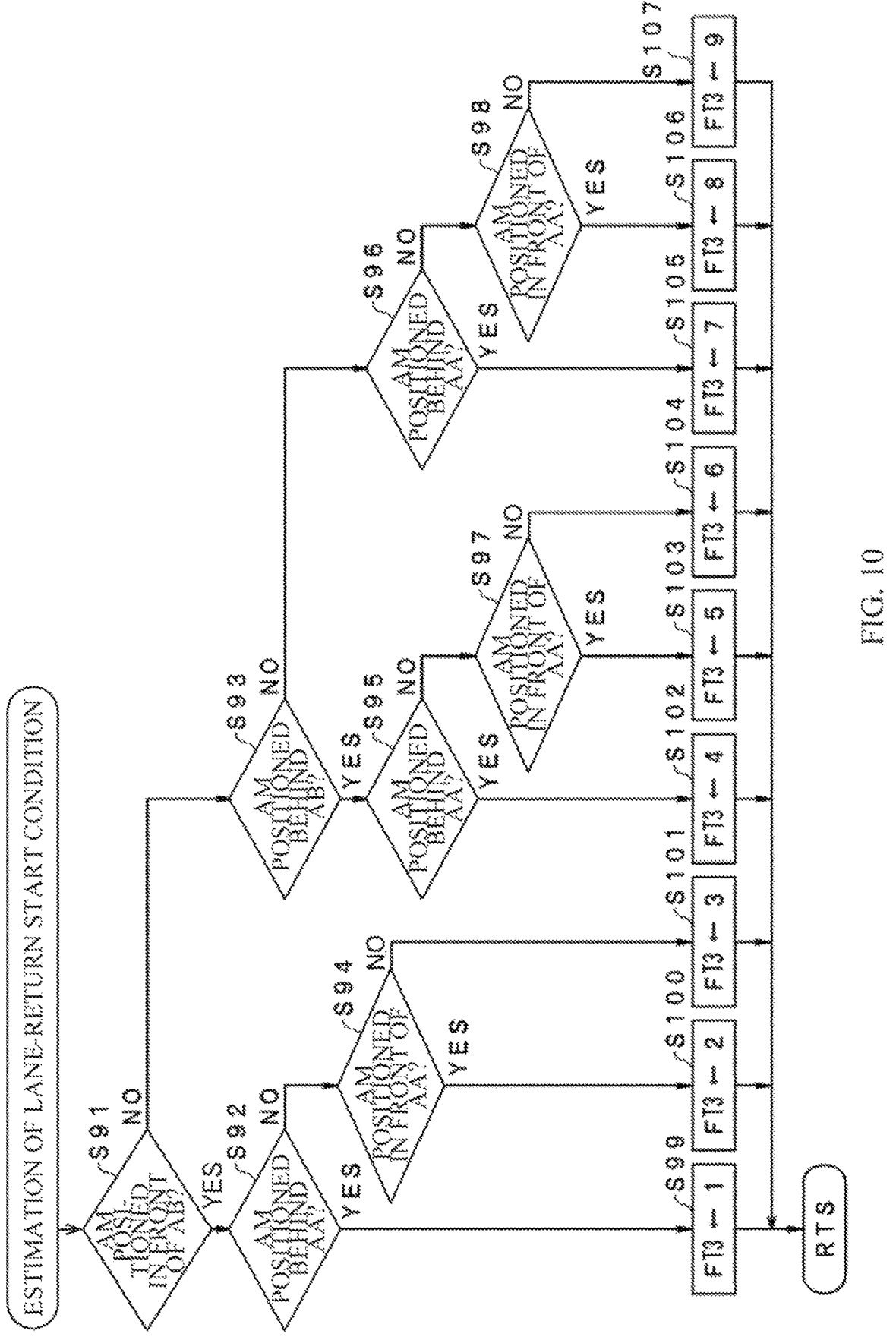
FIG. 10 is a flowchart of a sub-routine of estimating a lane-return start condition according to one example embodiment of the disclosure.

The estimation of the lane-return start condition may be performed in accordance with a sub-routine illustrated in FIG. 10. The sub-routine illustrated in FIG. 10 may start with Step S91 in which the driver assistance control unit 11 estimates whether the own-vehicle no-entry area AM will be positioned in front of the adjacent-lane-vehicle no-entry area AB assuming that the own vehicle M is traveling on the adjacent lane. If it is estimated that the own-vehicle no-entry area AM will be positioned in front of the adjacent-lane-vehicle no-entry area AB (Step S91: YES), the flow may proceed to Step S92. In contrast, if it is not estimated that the own-vehicle no-entry area AM will be positioned in front of the adjacent-lane-vehicle no-entry area AB (Step S91: NO), the flow may jump to Step S93.

In Step S92, the driver assistance control unit 11 may estimate whether the own-vehicle no-entry area AM will be positioned behind the preceding-vehicle no-entry area AA in the traveling direction. If it is estimated that the own-vehicle no-entry area AM will be positioned behind the preceding-vehicle no-entry area AA (Step S92: YES), the flow may proceed to Step S99. Otherwise (Step S92: NO), the flow may branch to Step S94.

In Step S94, the driver assistance control unit 11 may estimate whether the own-vehicle no-entry area AM will be positioned in front of the preceding-vehicle no-entry area AA in the traveling direction. If it is estimated that the own-vehicle no-entry area AM will be positioned in front of the preceding-vehicle no-entry area AA (Step S94: YES), the flow may proceed to Step S100. In contrast, if it is estimated that at least a part of the preceding-vehicle no-entry area AA will overlap with the own-vehicle no-entry area AM (Step S94: NO), the flow may branch to Step S101.

In contrast, if the flow branches from the Step S91 to Step S93, the driver assistance control unit 11 may estimate whether the own-vehicle no-entry area AM will be positioned behind the adjacent-lane-vehicle no-entry area AB. If it is estimated that the own-vehicle no-entry area AM will be positioned behind the adjacent-lane-vehicle no-entry area AB (Step S93: YES), the flow may proceed to Step S95. In contrast, if it is not estimated that the no-entry area AM of the own vehicle M will be positioned behind the adjacent-lane-vehicle no-entry area AB (Step S93: NO), the flow may branch to Step S96.

In Step S95, the driver assistance control unit 11 may estimate whether the own-vehicle no-entry area AM will be positioned behind the preceding-vehicle no-entry area AA. If it is estimated that the own-vehicle no-entry area AM will be positioned behind the preceding-vehicle no-entry area AA (Step S95: YES), the flow may proceed to Step S102. In contrast, if it is not estimated that the own-vehicle no-entry area AM will be positioned behind the preceding-vehicle no-entry area AA (Step S95: NO), the flow may branch to Step S97.

In Step S97, the driver assistance control unit 11 may estimate whether the own-vehicle no-entry area AM will be positioned in front of the preceding-vehicle no-entry area AA. If it is estimated that the own-vehicle no-entry area AM will be positioned in front of the preceding-vehicle no-entry area AA (Step S97: YES), the flow may proceed to Step S103. In contrast, if it is not estimated that the own-vehicle no-entry area AM will be positioned in front of the preceding-vehicle no-entry area AA (Step S97: NO), the flow may branch to Step S104.

If the flow branches from Step S93 to Step S96, the driver assistance control unit 11 may estimate whether the own-vehicle no-entry area AM will be positioned behind the preceding-vehicle no-entry area AA. If it is estimated that the own-vehicle no-entry area AM will be positioned behind the preceding-vehicle no-entry area AA (Step S96: YES), the flow may proceed to Step S105. In contrast, if it is not estimated that the own-vehicle no-entry area AM will be positioned behind the preceding-vehicle no-entry area AA (Step S96: NO), the flow may branch to Step S98.

In Step S98, the driver assistance control unit 11 may estimate whether the own-vehicle no-entry area AM will be positioned in front of the preceding-vehicle no-entry area AA. If it is estimated that the own-vehicle no-entry area AM will be positioned in front of the preceding-vehicle no-entry area AA (Step S98: YES), the flow may proceed to Step S106. In contrast, if it is not estimated that the own-vehicle no-entry area AM will be positioned in front of the preceding-vehicle no-entry area AA (Step S98: NO), the flow may branch to Step S107.

In Step S99, the driver assistance control unit 11 may set a flag FT3 of the lane-return start condition to 1 (FT3←1), following which the flow may proceed to Step S5 in FIG. 2. In Step S100, the driver assistance control unit 11 may set the flag FT3 of the lane-return start condition to 2 (FT3←2), following which the flow may proceed to Step S5 in FIG. 2. In Step S101, the driver assistance control unit 11 may set the flag FT3 of the lane-return start condition to 3 (FT3←3), following which the flow may proceed to Step S5 in FIG. 2. In Step S102, the driver assistance control unit 11 may set the flag FT3 of the lane-return start condition to 4 (FT3←4), following which the flow may proceed to Step S5 in FIG. 2. In Step S103, the driver assistance control unit 11 may set the flag FT3 of the lane-return start condition to 5 (FT3←5), following which the flow may proceed to Step S5 in FIG. 2. In Step S104, the driver assistance control unit 11 may set the flag FT3 of the lane-return start condition to 6 (FT3←6), following which the flow may proceed to Step S5 in FIG. 2. In Step S105, the driver assistance control unit 11 may set the flag FT3 of the lane-return start condition to 7 (FT3←7), following which the flow may proceed to Step S5 in FIG. 2. In Step S106, the driver assistance control unit 11 may set the flag FT3 of the lane-return start condition to 8 (FT3←8), following which the flow may proceed to Step S5 in FIG. 2. In Step S107, the driver assistance control unit 11 may set the flag FT3 of the lane-return start condition to 9 (FT3←9), following which the flow may proceed to Step S5 in FIG. 2.

[Generation of Overtaking Schedule]

In Step S5 in FIG. 2, the driver assistance control unit 11 may generate the overtaking schedule to be used to execute the ALC control, following which the flow may proceed to Step S6. The overtaking schedule generated in Step S5 may be used to collate the flags set in the determination of the overtaking conditions in Step S4 with an overtaking schedule mode map set in advance, to thereby select an execution mode of the ALC control.

In accordance with the overtaking schedule based on the selected mode, the driver assistance control unit 11 may perform the first ALC control adapted to move the own vehicle M to the adjacent lane and the second ALC control adapted to return the own vehicle M to the original lane while the own vehicle M is cruising or after the own vehicle M is accelerated or decelerated once. FIG. 30 is a conceptual diagram of the overtaking schedule mode map. As illustrated in FIG. 30, the overtaking schedule mode map according to the example embodiment may have first to nineteenth overtaking modes having different overtaking schedules.

The driver assistance control unit 11 may collate the values of the flags FMA, FMB, FAB, and FT1 to FT3 set in Steps S21 to S24 in FIG. 4 with the first to nineteenth overtaking modes to select a corresponding overtaking mode. If no corresponding overtaking mode is found, the driver assistance control unit 11 may determine that the overtaking conditions are not satisfied. For example, if the flag FMA of the relative vehicle speed M/A is 1, if the flag FT1 of the lane-change start condition is 4 or 5, if the flag FT2 of the lane-change completion condition is 3, or if the flag FT3 of the lane-return start condition is any of 1, 3, 4, 6, 7, and 9, the driver assistance control unit 11 may determine that the overtaking conditions are not satisfied because a corresponding overtaking mode is not set in the overtaking schedule mode map.

In addition, if the values of the flags FMA, FMB, and FAB and the flag FT1 of the lane-change start condition correspond to those of the seventh overtaking mode in the overtaking schedule mode map, the driver assistance control unit 11 may determine that the overtaking conditions are not satisfied. For example, in the seventh overtaking mode, the overtaking control may be interrupted because the own vehicle M is not able to overtake the preceding vehicle A even though the first ALC control is performed.

According to the example embodiment, when any of the first to sixth overtaking modes and the eighth to nineteenth overtaking modes in overtaking schedule mode map illustrated in FIG. 30 is selected, the driver assistance control unit 11 may determine that the overtaking conditions are satisfied. Note that the data item "position after lane change" stored in the overtaking schedule mode map may indicate whether the own vehicle M will be positioned in front of the adjacent-lane vehicle B or behind the adjacent-lane vehicle B after the lane change of the own vehicle M in the first ALC control in accordance with the selected mode. The position of the own vehicle M after the lane change may be determined depending on the selected mode.

The data item "ALC control" stored in the overtaking schedule mode map may have five modes including a cruising mode, a pre-lane change acceleration mode, a pre-lane change deceleration mode, a post-lane change acceleration mode, and a post-lane change deceleration mode. In the cruising mode, the first ALC control and the second ALC control may be executed while a current vehicle speed is maintained. In the pre-lane change acceleration mode, the own vehicle speed VM may be accelerated to a target vehicle speed before the lane change of the own vehicle M in the first ALC control, and the target vehicle speed may be maintained until the second ALC control is completed. Note that the acceleration rate may be 1 [m/s 2]. For example, the own vehicle M traveling at 50 kilometers per hour may be accelerated to 60 kilometers per hour in one second.

In the pre-lane change deceleration mode, the own vehicle speed VM may be decelerated to a target vehicle speed before the lane change of the own vehicle M in the first ALC control, and the target vehicle speed may be maintained until the second ALC control is completed. Note that the deceleration rate (negative acceleration rate) may be 1 [m/s$^2$]. For example, the own vehicle M traveling at 50 kilometers per hour may be decelerated to 40 kilometers per hour in one second.

In the post-lane change acceleration mode, the own vehicle speed VM traveling on the adjacent lane may be accelerated to a target vehicle speed before the lane change of the own vehicle M in the second ALC control. In the post-lane change deceleration mode, the own vehicle speed VM traveling on the adjacent lane may be decelerated to a target vehicle speed before the lane change of the own vehicle M in the second ALC control. Note that the acceleration rate and the deceleration (negative acceleration) rate in the post-lane change acceleration mode and the post-lane change deceleration mode may be the same as those in the pre-lane change acceleration mode and the pre-lane change deceleration mode described above.

FIGS. 11 to 29 illustrate respective initial states of the own vehicle M, the preceding vehicle A, and the adjacent-lane vehicle B before the first ALC control in the first to nineteenth overtaking mode. In the seventh overtaking mode illustrated in FIG. 17, the front edge of the own-vehicle no-entry area AM overlaps with the preceding-vehicle no-entry area AA, and the rear edge of the own-vehicle no-entry area AM overlaps with the adjacent-lane-vehicle no-entry area AB (FT1=6), and the preceding vehicle speed VA is equal to the adjacent-lane vehicle speed VB. In this case, the own vehicle M is not able to overtake the preceding vehicle A even if the own vehicle speed VM is decelerated once to a vehicle speed lower than or equal to the adjacent-lane vehicle speed VB and thereafter the first ALC control is executed to move the own vehicle M to a position behind the adjacent-lane vehicle B.

Figure 13:
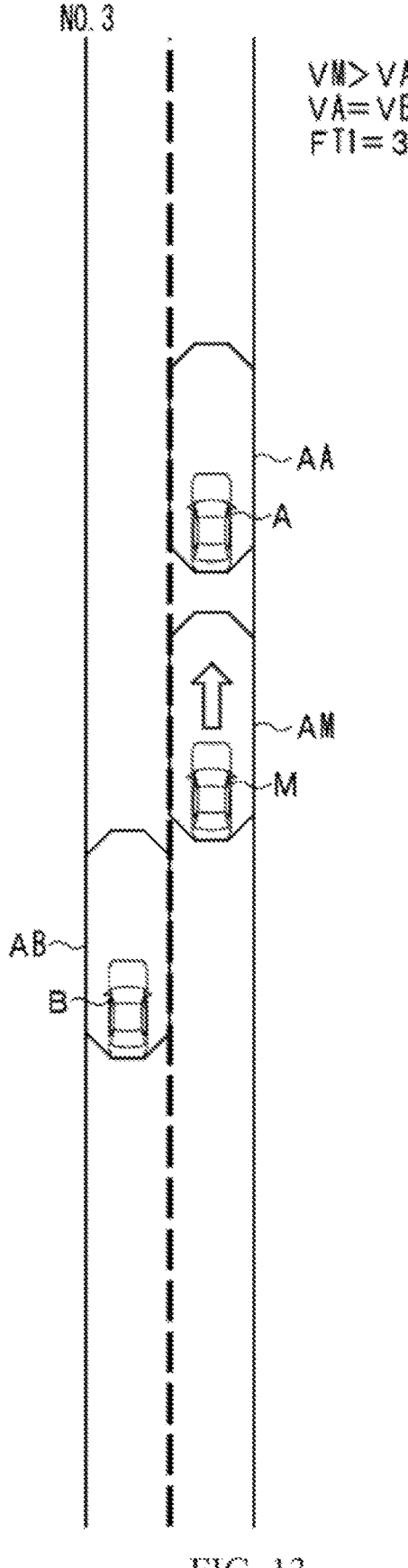
FIG. 13 is an explanatory diagram illustrating an initial position in a third overtaking mode of the overtaking schedule according to one example embodiment of the disclosure.

In the third overtaking mode illustrated in FIG. 13, the own-vehicle no-entry area AM is positioned between the preceding-vehicle no-entry area AA and the adjacent-lane-vehicle no-entry area AB, and the preceding vehicle speed VA is equal to the adjacent-lane vehicle speed VB, as in the seventh overtaking mode. However, in this third overtaking mode, the front edge of the own-vehicle no-entry area AM is positioned behind the preceding-vehicle no-entry area AA (FT1=3), the own vehicle M may be accelerated to approach the preceding vehicle A before the first ALC control in order to secure a space between the own-vehicle no-entry area AM and the adjacent-lane-vehicle no-entry area AB.

This allows the first ALC control to be executed. In this case, even if the lane change of the own vehicle M is made in a state where the front edge of the own-vehicle no-entry area AM coincides with the rear edge of the preceding-vehicle no-entry area AA, the own vehicle M makes it possible to complete the lane change smoothly such that the own-vehicle no-entry area AM does not overlap with the preceding-vehicle no-entry area AA, owing to the cut portions AMc provided on the front edge of the own-vehicle no-entry area AM and the cut portions AAc provided on the rear edge of the preceding-vehicle no-entry area AA.

Figure 14:
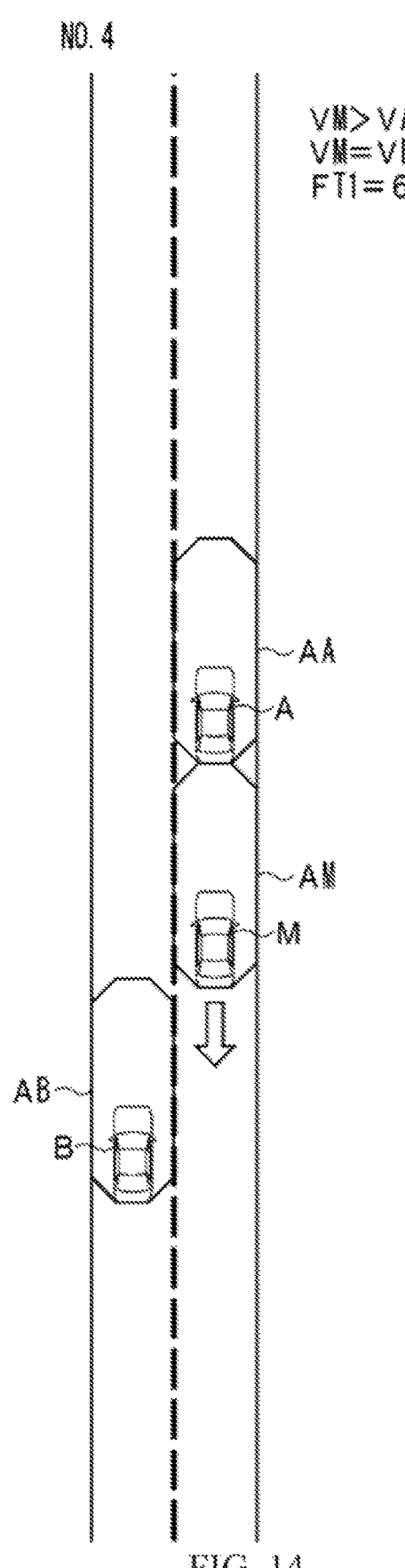
FIG. 14 is an explanatory diagram illustrating an initial position in a fourth overtaking mode of the overtaking schedule according to one example embodiment of the disclosure.
Figure 15:
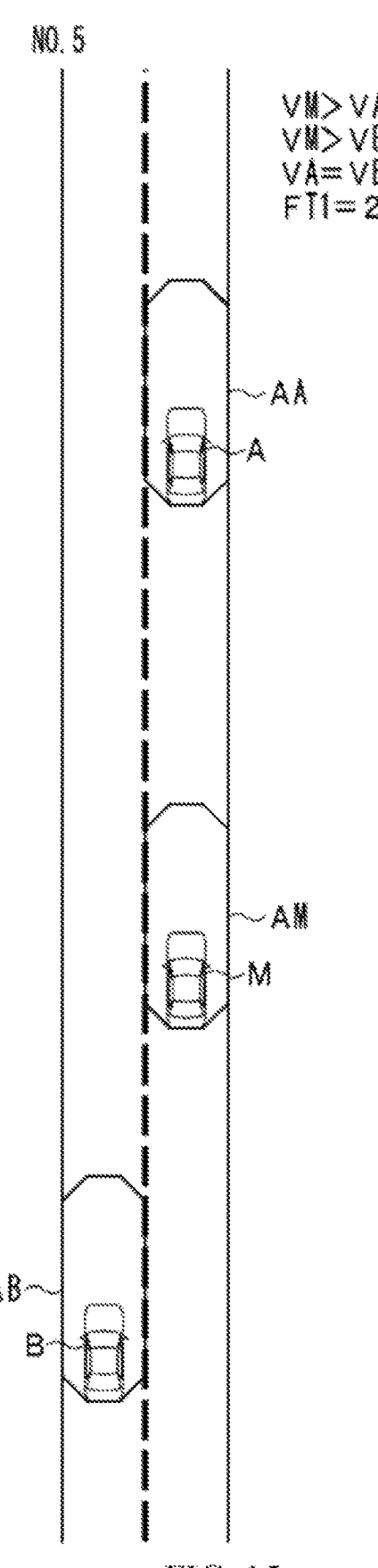
FIG. 15 is an explanatory diagram illustrating an initial position in a fifth overtaking mode of the overtaking schedule according to one example embodiment of the disclosure.
Figure 16:
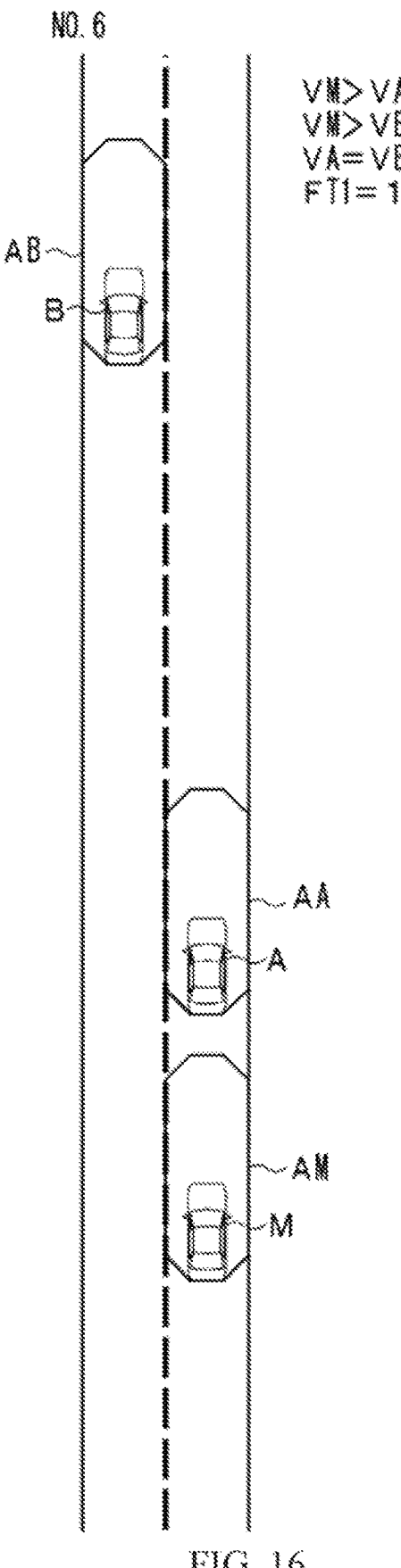
FIG. 16 is an explanatory diagram illustrating an initial position in a sixth overtaking mode of the overtaking schedule according to one example embodiment of the disclosure.
Figure 17:
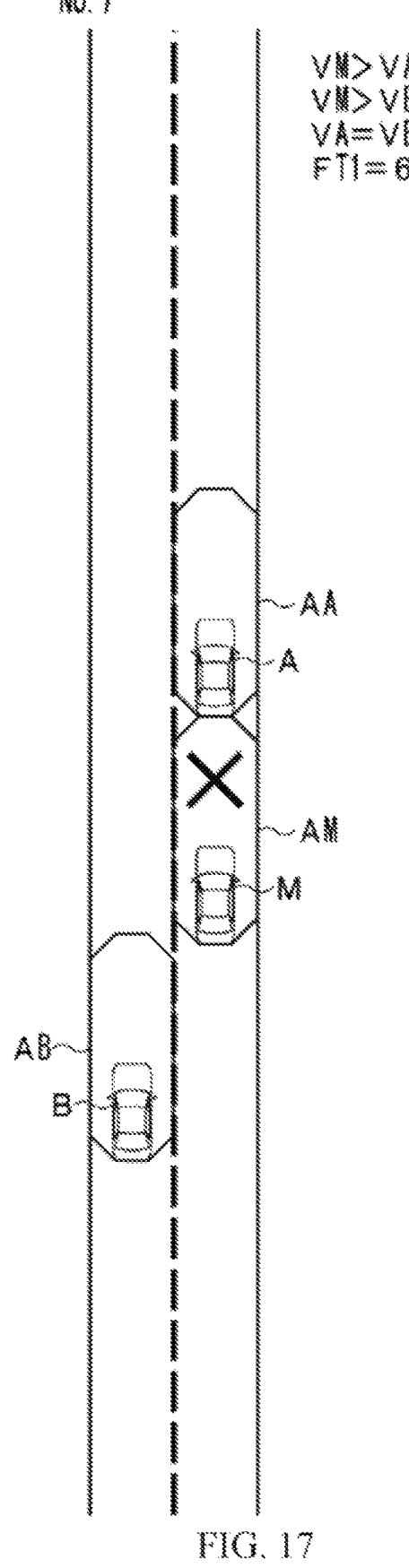
FIG. 17 is an explanatory diagram illustrating an initial position in a seventh overtaking mode of the overtaking schedule according to one example embodiment of the disclosure.
Figure 18:
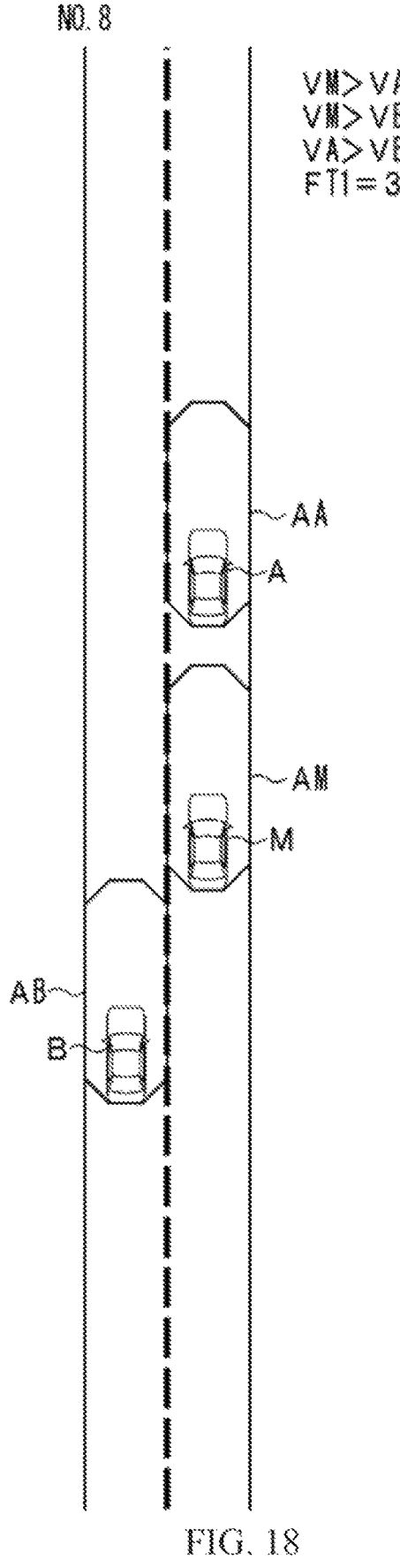
FIG. 18 is an explanatory diagram illustrating an initial position in an eighth overtaking mode of the overtaking schedule according to one example embodiment of the disclosure.

In the fourth overtaking mode illustrated in FIG. 14, the front edge of the own-vehicle no-entry area AM overlaps with the preceding-vehicle no-entry area AA, and the rear edge of the own-vehicle no-entry area AM overlaps with the adjacent-lane-vehicle no-entry area AB (FT1=6), as in the seventh overtaking mode illustrated in FIG. 17 described above. However, in this fourth overtaking mode, the adjacent-lane vehicle speed VB is higher than the preceding vehicle speed VA (VB>VA). Accordingly, the own vehicle speed VM may be decelerated to a vehicle speed lower than the adjacent-lane vehicle speed VB (within a range of VM>VA) to allow the adjacent-lane vehicle B to pass by the own vehicle M before the first ALC control. Thereafter, the lane change of the own vehicle M to a position behind the adjacent-lane vehicle B may be performed. This enables the own vehicle M to overtake the preceding vehicle A.

Figure 19:
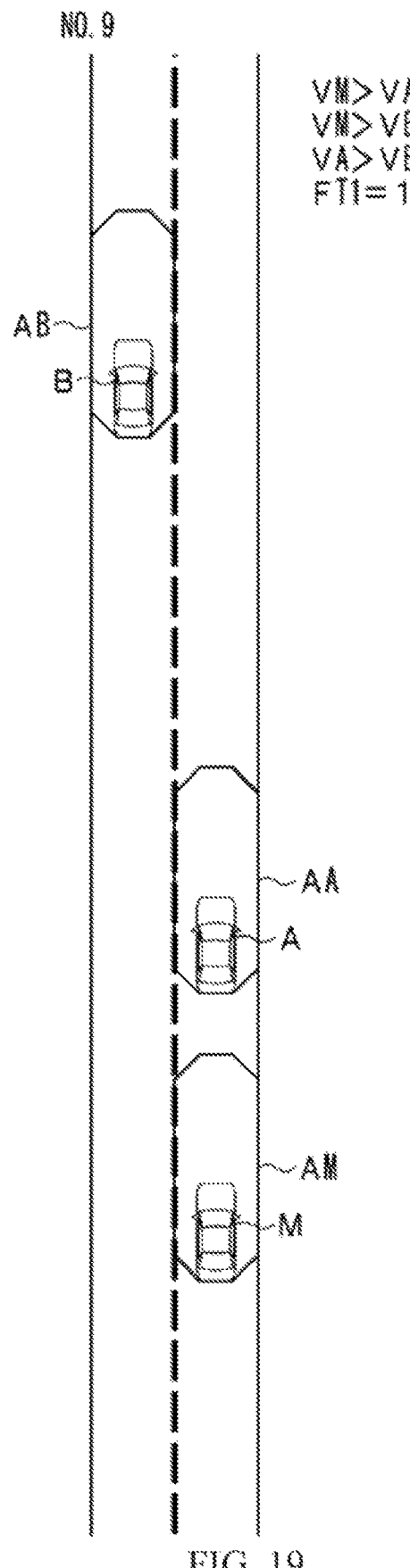
FIG. 19 is an explanatory diagram illustrating an initial position in a ninth overtaking mode of the overtaking schedule according to one example embodiment of the disclosure.

In the ninth overtaking mode illustrated in FIG. 19, the adjacent-lane vehicle B travels in front of the own vehicle M and the preceding vehicle A. In this case, the first ALC control may be performed in the cruising mode. However, because the preceding vehicle speed VA is higher than the adjacent-lane vehicle speed VB, an inter-vehicular distance between the preceding vehicle A and the adjacent-lane vehicle B may be gradually shortened. Accordingly, the own vehicle speed VM may be accelerated after the lane change of the own vehicle M to the adjacent lane so that the own vehicle M rapidly overtakes the preceding vehicle A, following which the second ALC control may be executed. This enables the own vehicle M to return to the original lane smoothly.

Figure 20:
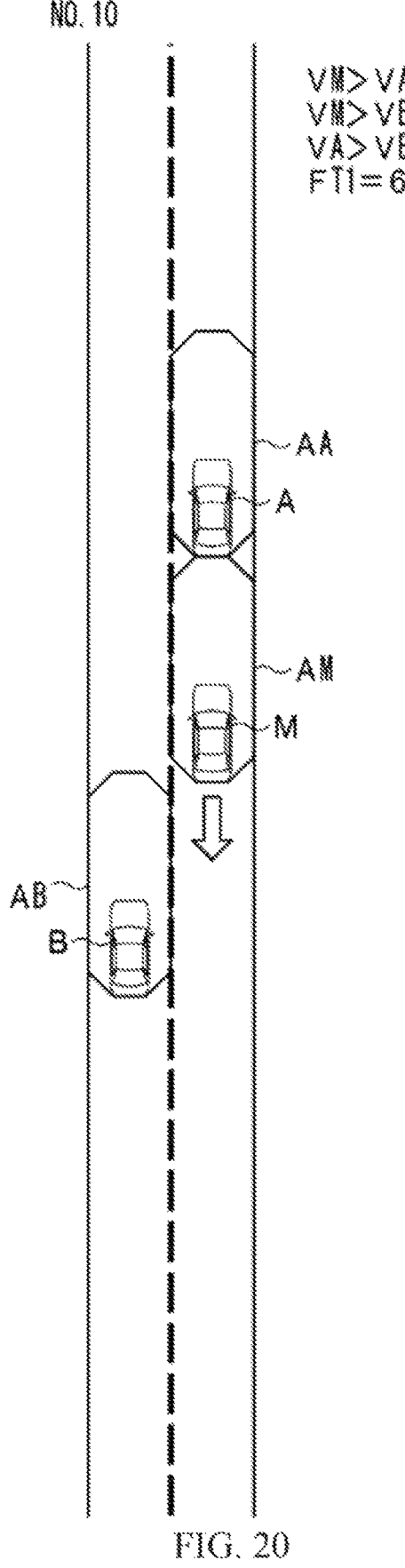
FIG. 20 is an explanatory diagram illustrating an initial position in a tenth overtaking mode of the overtaking schedule according to one example embodiment of the disclosure.
Figure 21:
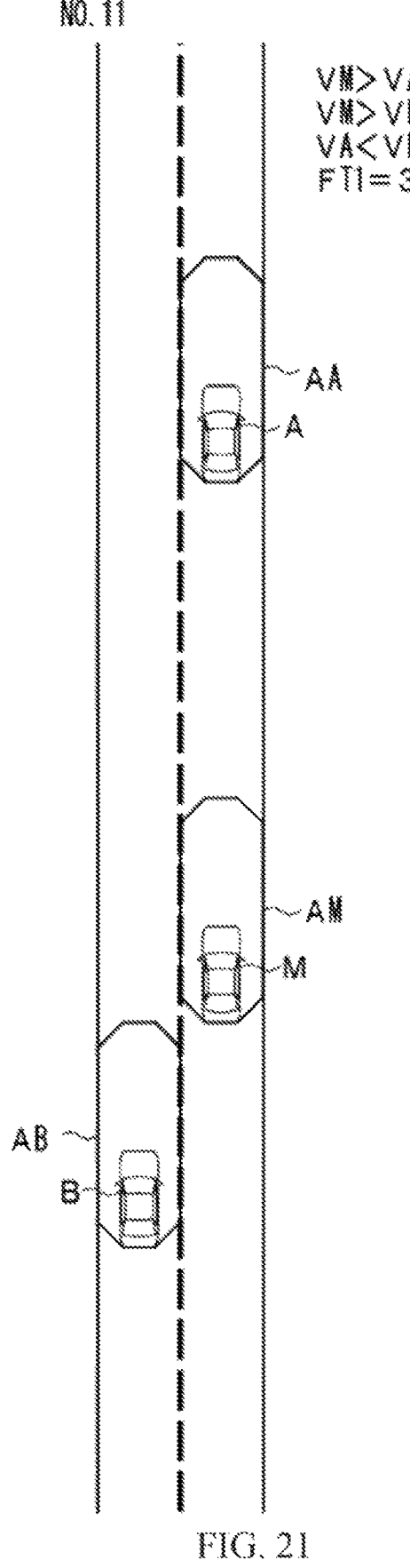
FIG. 21 is an explanatory diagram illustrating an initial position in an eleventh overtaking mode of the overtaking schedule according to one example embodiment of the disclosure.
Figure 22:
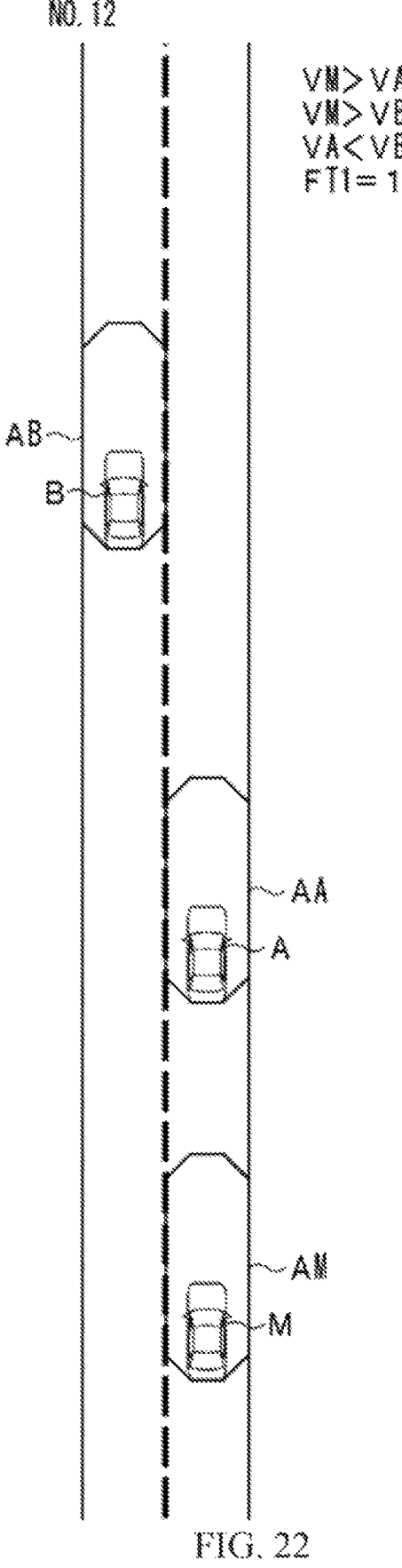
FIG. 22 is an explanatory diagram illustrating an initial position in a twelfth overtaking mode of the overtaking schedule according to one example embodiment of the disclosure.

In the tenth overtaking mode illustrated in FIG. 20, the front edge of the own-vehicle no-entry area AM overlaps with the preceding-vehicle no-entry area AA, and the rear edge of the own-vehicle no-entry area AM overlaps with the adjacent-lane-vehicle no-entry area AB (FT1=6), as in the seventh overtaking mode illustrated in FIG. 17 described above. However, in this tenth overtaking mode, the adjacent-lane vehicle speed VB is lower than the preceding vehicle speed VA (VA>VB). Accordingly, the own vehicle speed VM may be decelerated (within a range of VM>VB) before the first ALC control to secure a space necessary for the first ALC control between the front edge of the own-vehicle no-entry area AM and the preceding-vehicle no-entry area AA. This enables the own vehicle M to make a smooth lane change to a position in front of the adjacent-lane-vehicle no-entry area AB.

Figure 23:
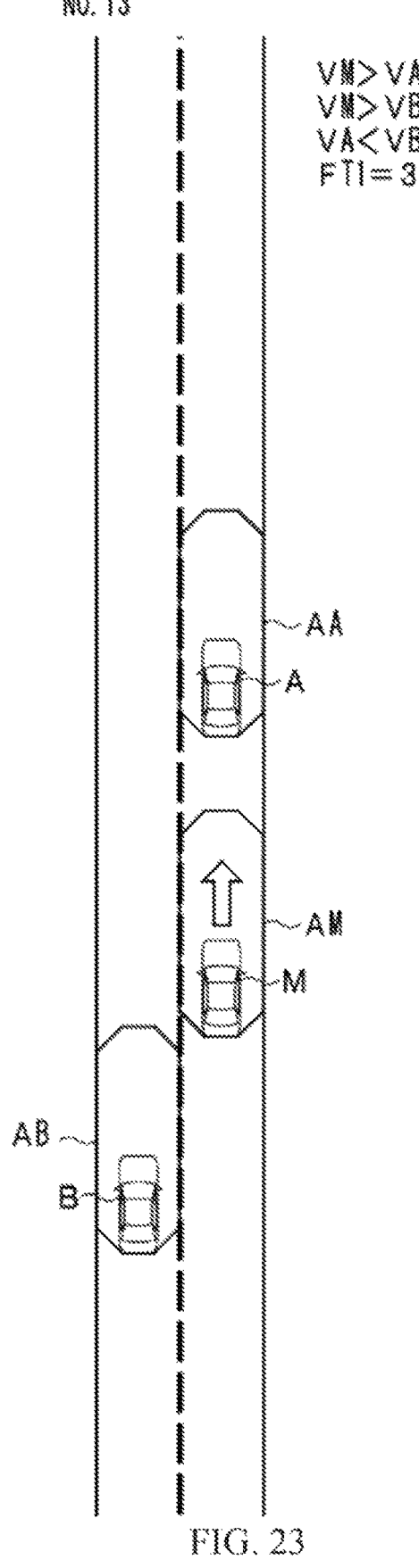
FIG. 23 is an explanatory diagram illustrating an initial position in a thirteenth overtaking mode of the overtaking schedule according to one example embodiment of the disclosure.

In the thirteenth overtaking mode illustrated in FIG. 23, the rear edge of the own-vehicle no-entry area AM overlaps with the adjacent-lane-vehicle no-entry area AB (FT1=3), and the adjacent-lane vehicle speed VB is higher than the preceding vehicle speed VA (VB>VA). Accordingly, it is possible to decelerate the own vehicle speed VM to move the own vehicle M to a position behind the adjacent-lane vehicle B. However, in this thirteenth overtaking mode, the own vehicle speed VM may be accelerated before the first ALC control, and thereafter the own vehicle M may be moved to a position in front of the adjacent-lane-vehicle no-entry area AB. This enables the own vehicle M to make a smooth lane change in accordance with the intention of the driver.

Figure 24:
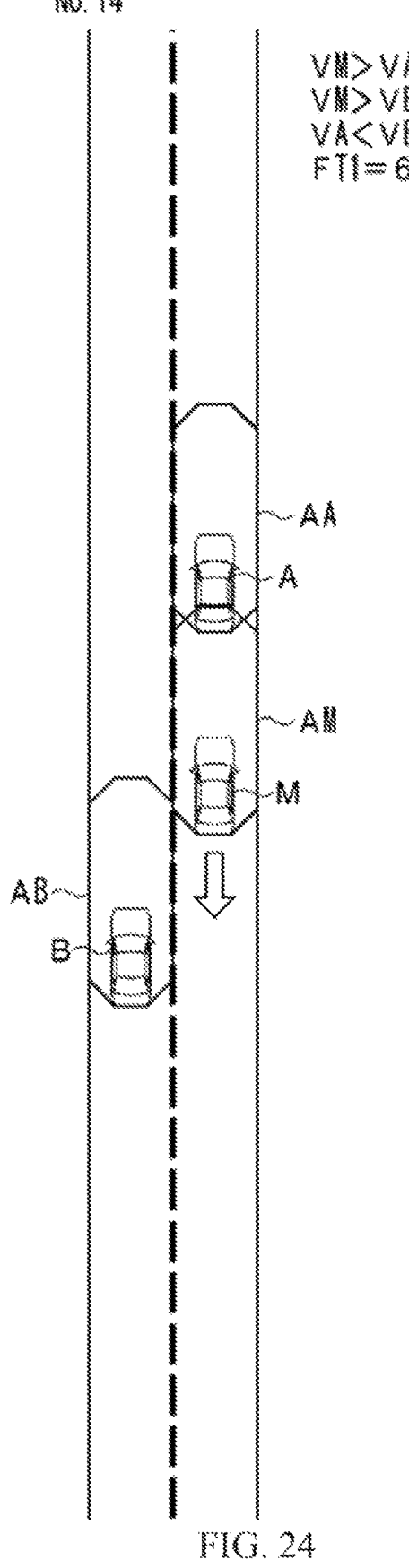
FIG. 24 is an explanatory diagram illustrating an initial position in a fourteenth overtaking mode of the overtaking schedule according to one example embodiment of the disclosure.

In the fourteenth overtaking mode illustrated in FIG. 24, the front edge of the own-vehicle no-entry area AM overlaps with the preceding-vehicle no-entry area AA, and the rear edge of the own-vehicle no-entry area AM overlaps with the adjacent-lane-vehicle no-entry area AB (FT1=6). However, in this fourteenth overtaking mode, the adjacent-lane vehicle speed VB is higher than the preceding vehicle speed VA (VB>VA). Accordingly, the own vehicle speed VM may be decelerated (within a range of VM>VA) before the lane change of the own vehicle M to a position behind the adjacent-lane vehicle B. This enables the own vehicle M to overtake the preceding vehicle A.

Figure 25:
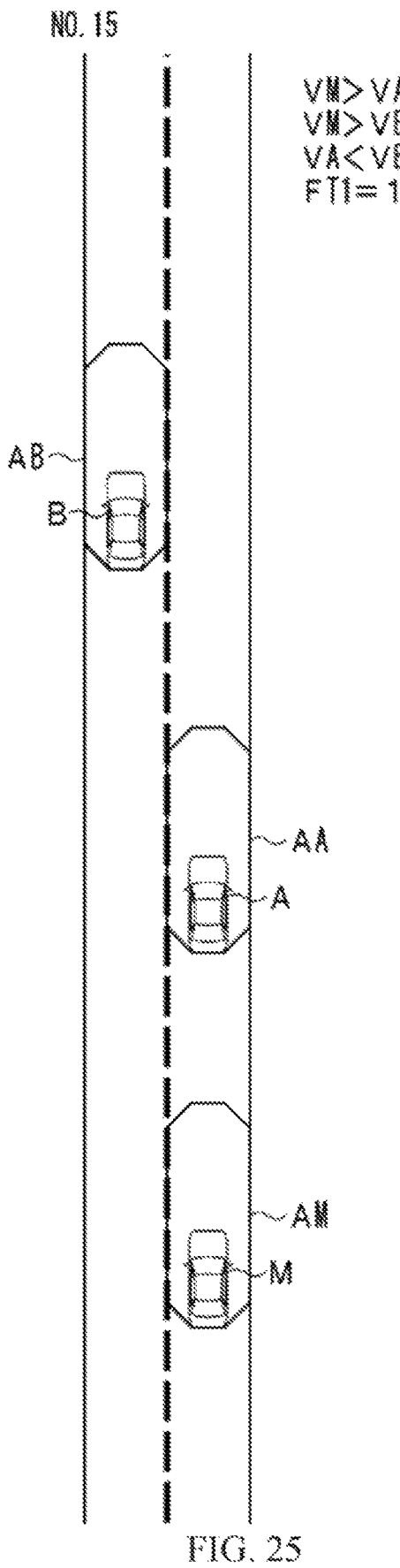
FIG. 25 is an explanatory diagram illustrating an initial position in a fifteenth overtaking mode of the overtaking schedule according to one example embodiment of the disclosure.
Figure 26:
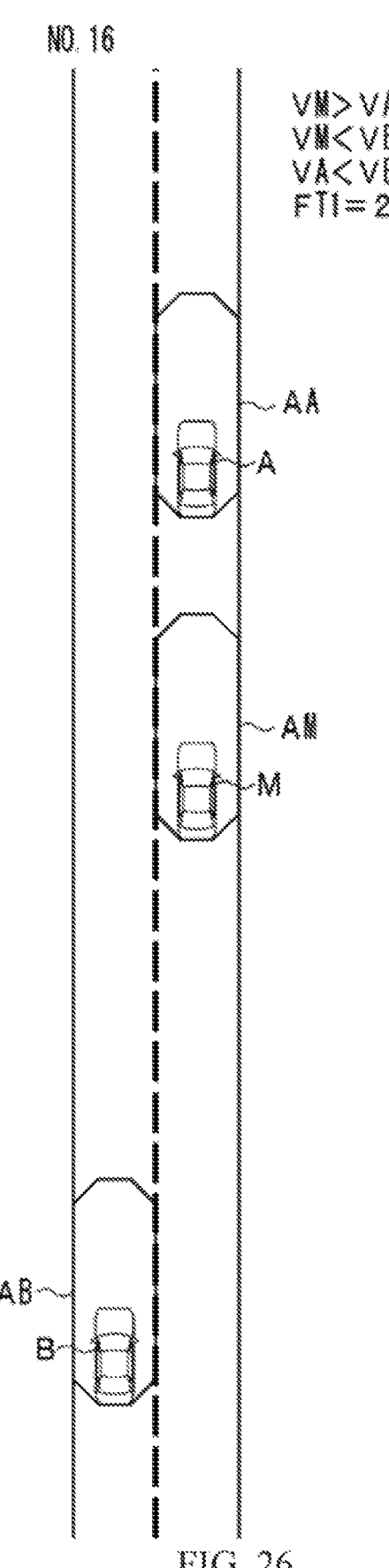
FIG. 26 is an explanatory diagram illustrating an initial position in a sixteenth overtaking mode of the overtaking schedule according to one example embodiment of the disclosure.
Figure 27:
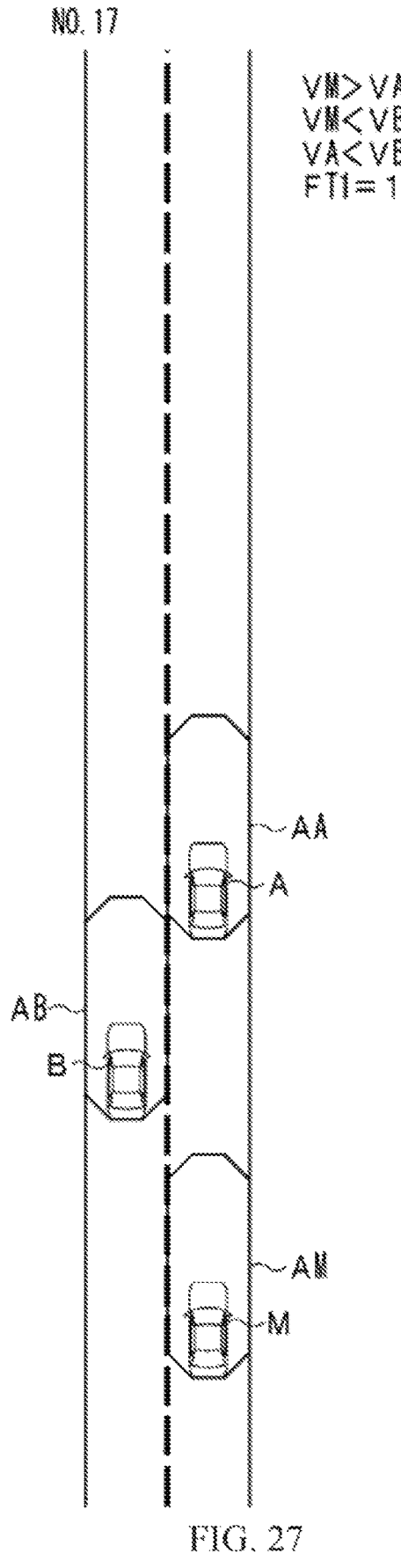
FIG. 27 is an explanatory diagram illustrating an initial position in a seventeenth overtaking mode of the overtaking schedule according to one example embodiment of the disclosure.

In the fifteenth overtaking mode illustrated in FIG. 25, it is possible to execute the first ALC control to move the own vehicle M to the adjacent lane in the cruising mode. However, in this fifteenth overtaking mode, the adjacent-lane vehicle speed VB is lower than the own vehicle speed VM (VM>VB). Accordingly, the own vehicle speed VM may be decelerated after the first ALC control so that the own-vehicle no-entry area AM comes closer to the adjacent-lane-vehicle no-entry area AB, following which the second ALC control may be performed to return the own vehicle M to the original lane.

Figure 28:
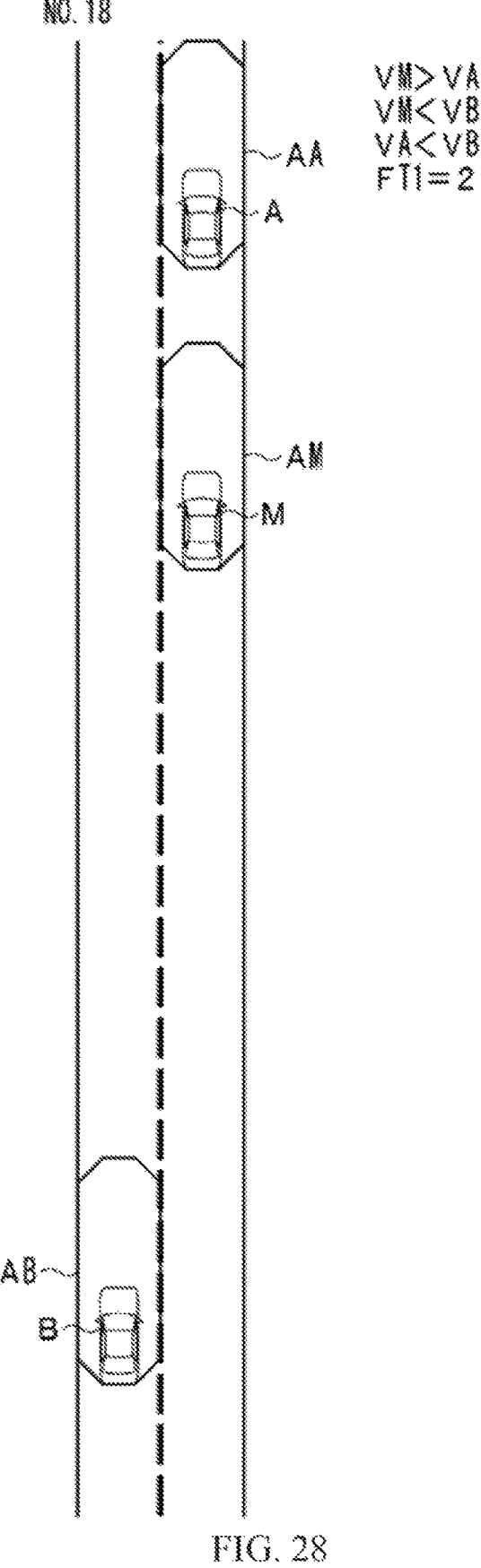
FIG. 28 is an explanatory diagram illustrating an initial position in an eighteenth overtaking mode of the overtaking schedule according to one example embodiment of the disclosure.

In the eighteenth overtaking mode illustrated in FIG. 28, it is possible to execute the first ALC control to move the own vehicle M to the adjacent lane in the cruising mode. However, in this eighteenth overtaking mode, because the adjacent-lane vehicle speed VB is higher than the own vehicle speed VM (VM<VB), an inter-vehicular distance between the own vehicle M and the adjacent-lane vehicle B may be gradually shortened. Accordingly, the own vehicle speed VM may be accelerated after the first ALC control so that the own vehicle M rapidly overtakes the preceding vehicle A, following which the second ALC control may be performed.

Figure 29:
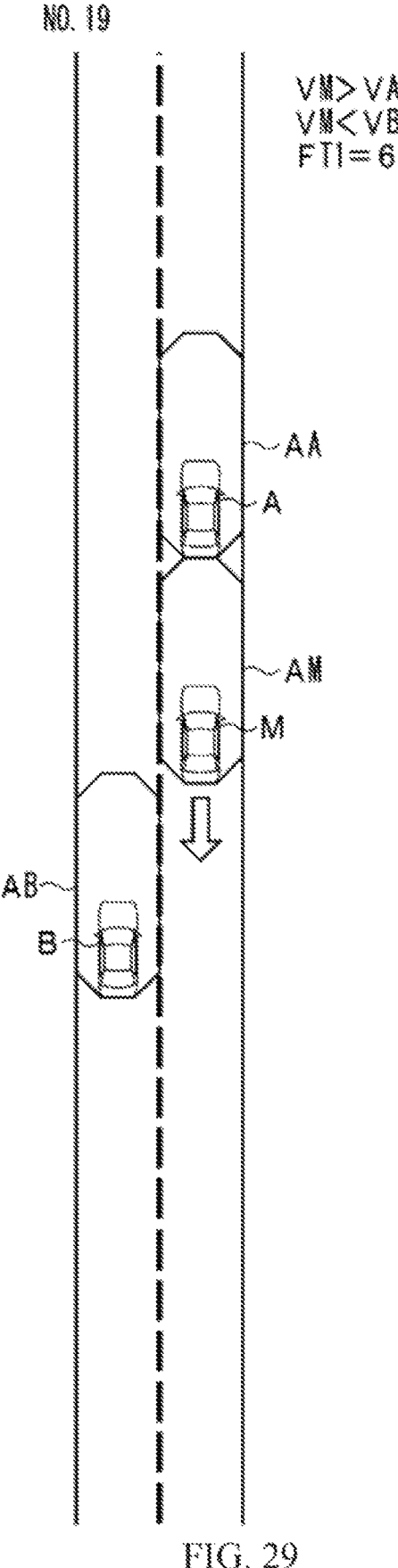
FIG. 29 is an explanatory diagram illustrating an initial position in a nineteenth overtaking mode of the overtaking schedule according to one example embodiment of the disclosure.

In the nineteenth overtaking mode illustrated in FIG. 29, the front edge of the own-vehicle no-entry area AM overlaps with the preceding-vehicle no-entry area AA, and the rear edge of the own-vehicle no-entry area AM overlaps with the adjacent-lane-vehicle no-entry area AB (FT1=6). However, in this nineteenth overtaking mode, the adjacent-lane vehicle speed VB is higher than the preceding vehicle speed VA (VA<VB). Accordingly, the own vehicle speed VM may be decelerated (within a range of VM>VA), following which the first ALC control may be executed to move the own vehicle M to a position behind the adjacent-lane vehicle B. This enables the own vehicle M to overtake the preceding vehicle A.

[Determination Regarding Overtaking Conditions and Execution of Overtaking Control]

Thereafter, in Step S6, the driver assistance control unit 11 may determine whether the overtaking conditions have been satisfied. As described above, if the overtaking conditions set based on the current traveling state correspond to any of the first to sixth overtaking modes and the eighth to nineteenth overtaking modes in the overtaking schedule mode map, the driver assistance control unit 11 may determine that the overtaking conditions have been satisfied (Step S6: YES), following which the flow may proceed to Step S7. If the overtaking conditions correspond to neither of the first to sixth overtaking conditions and the eighth to nineteenth overtaking modes, the driver assistance control unit 11 may determine that the overtaking conditions have not been satisfied (Step S6: NO), following which the flow may exit the routine.

In Step S7, the driver assistance control unit 11 may activate the notification device 35 during the automatic driving to notify the driver of the activation of the overtaking control, following which the flow may proceed to Step S8. In Step S8, the driver assistance control unit 11 may wait for an instruction from the driver to approve the overtaking control for a predetermined period of time (e.g., 0.5 to 1 second). Whether the overtaking control is approved may be determined based on whether the turn signal lamp switch 26 on the lane change side is turned on by the driver, for example.

If no instruction to approve the overtaking control is issued by the driver (Step S8: NO), the flow may exit the routine as it is. In contrast, if the instruction to approve the overtaking control is issued by the driver (Step S8: YES), the flow may proceed to Step S9. In Step S9, the driver assistance control unit 11 may execute the overtaking control, following which the flow may exit the routine. In the example embodiment, the driver assistance control unit 11, which serves as the overtaking control processor, includes an overtaking control execution unit. The driver assistance control unit 11 may perform the process at Step S9 as a process performed by the overtaking control execution unit.

The driver assistance control unit 11 may execute the overtaking control in accordance with the schedule of the selected overtaking mode to thereby return the own vehicle M to a position in front of the preceding vehicle A. Described below is exemplary overtaking control to cause the own vehicle M to overtake the preceding vehicle A in accordance with the schedule of the selected overtaking mode.

[Twelfth Overtaking Mode]

Figure 31A:
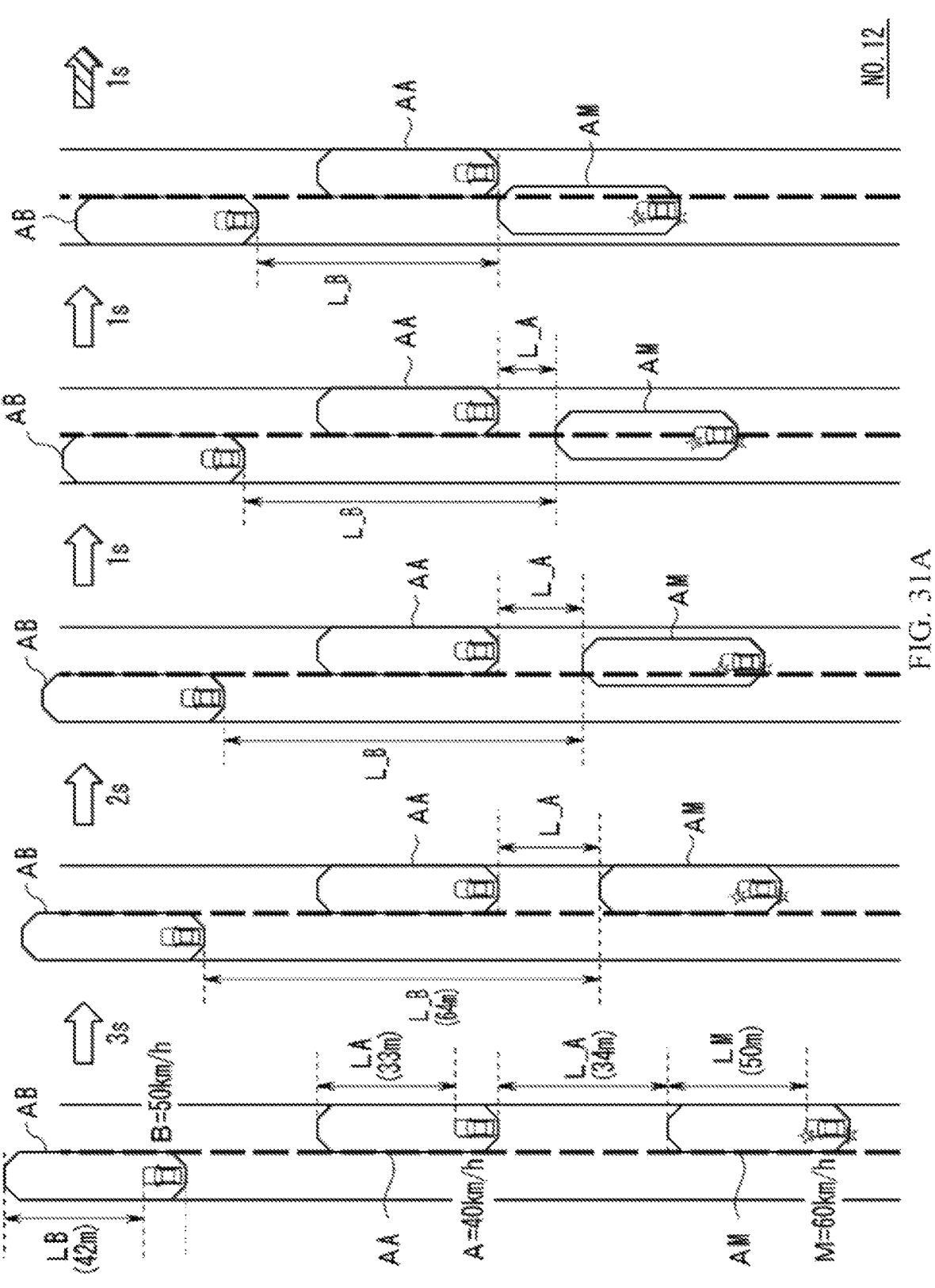
FIG. 31A is an explanatory diagram illustrating a lane change timing in a case of overtaking a preceding vehicle in the twelfth overtaking mode of the overtaking schedule mode map according to one example embodiment of the disclosure.
Figure 31B:
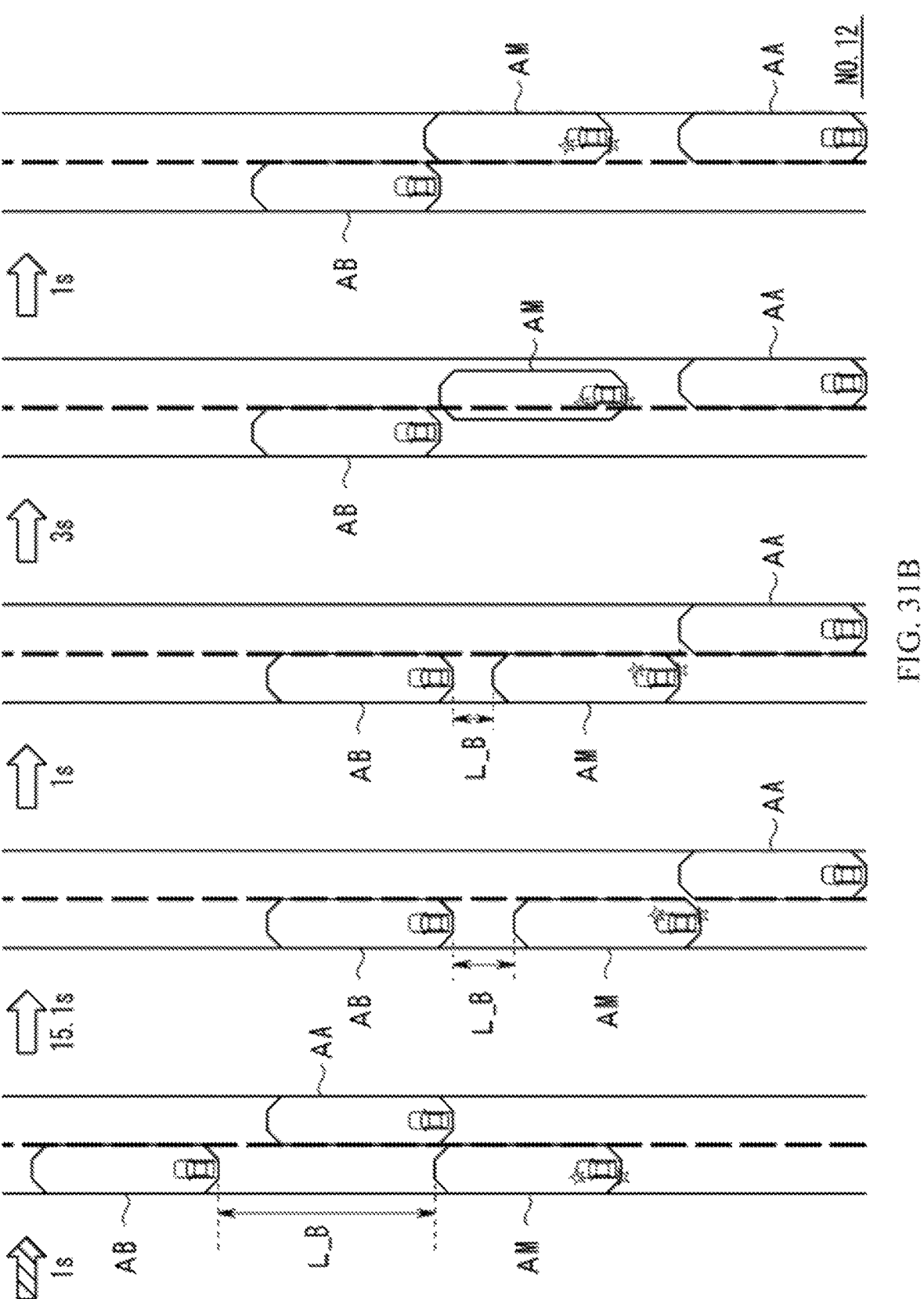
FIG. 31B is an explanatory diagram following FIG. 31B and illustrating the lane change timing in a case of overtaking the preceding vehicle in the twelfth overtaking mode of the overtaking schedule mode map according to one example embodiment of the disclosure.

Exemplary overtaking control to cause the own vehicle M to overtake the preceding vehicle A in accordance with the schedule set in the twelfth overtaking mode will now be described with reference to FIGS. 31A and 31B. In this example, the frontal distances LM, LA, and LB may each correspond to the TTC of 3 seconds, and the own-vehicle no-entry area AM, the preceding-vehicle no-entry area AA, and the adjacent-lane-vehicle no-entry area AB may be determined based on the respective frontal distances LM, LA, and LB. That is, the entire length of the own-vehicle no-entry area AM may be calculated by adding the entire length of the own vehicle M to the frontal distance LM, the entire length of the preceding-vehicle no-entry area AA may be calculated by adding the entire length of the preceding vehicle A to the frontal distance LA, and the entire length of the adjacent-lane-vehicle no-entry area AB may be calculated by adding the entire length of the adjacent-lane vehicle B to the frontal distance LB. In the example illustrated in FIGS. 31A and 31B, the own vehicle speed VM may be 60 kilometers per hour, the preceding vehicle speed VA may be 40 kilometers per hour, and the adjacent-lane vehicle speed VB may be 50 kilometers per hour. Accordingly, the frontal distance LM may be 50 meters, the frontal distance LA may be 33 meters, the frontal distance LB may be 42 meters, and the entire lengths of the own vehicle M, the preceding vehicle A, and the adjacent-lane vehicle B may be each 6 meters. A first lane change may be completed in five seconds after the start of the lane change.

When the overtaking conditions corresponding to the twelfth overtaking mode are satisfied, the driver assistance control unit 11 may first turn on the turn signal lamp 31 on a lane change side three seconds before the start of the overtaking control. Three seconds later than turning on the turn signal lamp 31, the driver assistance control unit 11 may start the first ALC control to move the own vehicle M to the adjacent lane. When the lap time TTC_A to overlapping of the own-vehicle no-entry area AM with the preceding-vehicle no-entry area AA is three seconds, the turn signal lamp 31 is to be turned on at least 16.5 meters before a start position of the lane change of the own vehicle M in order to start the lane change within the lap time TTC_A because a speed difference between the own vehicle M and the preceding vehicle A is 20 kilometers per hour. Note that, in FIGS. 31A and 31B, the interval area distance L_A may be 34 meters when the turn signal lamp 31 is turned on, and the ALC control may be performed in the cruising mode.

Thereafter, the lane change may be completed in five seconds. Even if the front edge of the own-vehicle no-entry area AM substantially coincides with the rear edge of the preceding-vehicle no-entry area AA in the lateral direction before the completion of the lane change, the own vehicle M makes it possible to complete the lane change such that the own-vehicle no-entry area AM does not overlap with the preceding-vehicle no-entry area AA, owing to the cut portions AMc at the four corners of the own-vehicle no-entry area AM and the cut portions AAc at the four corners of the preceding-vehicle no-entry area AA each of which corresponds to the TTC of one second. Thereafter, the own vehicle M may overtake the preceding vehicle A with the speed difference of 20 kilometers per hour between the own vehicle speed VM and the preceding vehicle speed VA. Note that hatched arrows is in FIGS. 31A and 31B indicate common time.

Thereafter, when the cut portions AMc on the rear edge of the own-vehicle no-entry area AM overlap with the cut portions AAc on the front edge of the preceding-vehicle no-entry area AA in the lateral direction, the second ALC control to return the own vehicle M to the original lane may be performed. Because the own vehicle speed VM is 60 kilometers per hour, the adjacent-lane vehicle speed VB is 50 kilometers per hour, and a speed difference therebetween is thus 10 kilometers per hour, the interval area distance L_B between the adjacent-lane vehicle B and the own vehicle M having overtaken the preceding vehicle A is to be at least about 8.5 meters upon the second lane change of the own vehicle M to a position in front of the preceding-vehicle no-entry area AA, when the lap time TTC_B is three seconds.

Thereafter, the own vehicle M may be returned to the original lane in five seconds. Even if the rear edge of own-vehicle no-entry area AM overlaps with the preceding-vehicle no-entry area AA in the middle of the lane change, or even if the front edge of the own-vehicle no-entry area AM overlaps with the adjacent-lane-vehicle no-entry area AB, the own-vehicle no-entry area AM is prevented from overlapping with the preceding-vehicle no-entry area AA or the adjacent-lane-vehicle no-entry area AB owing to the cut portions AMc, AAc, and ABc.

[Thirteenth Overtaking Mode]

Figure 32A:
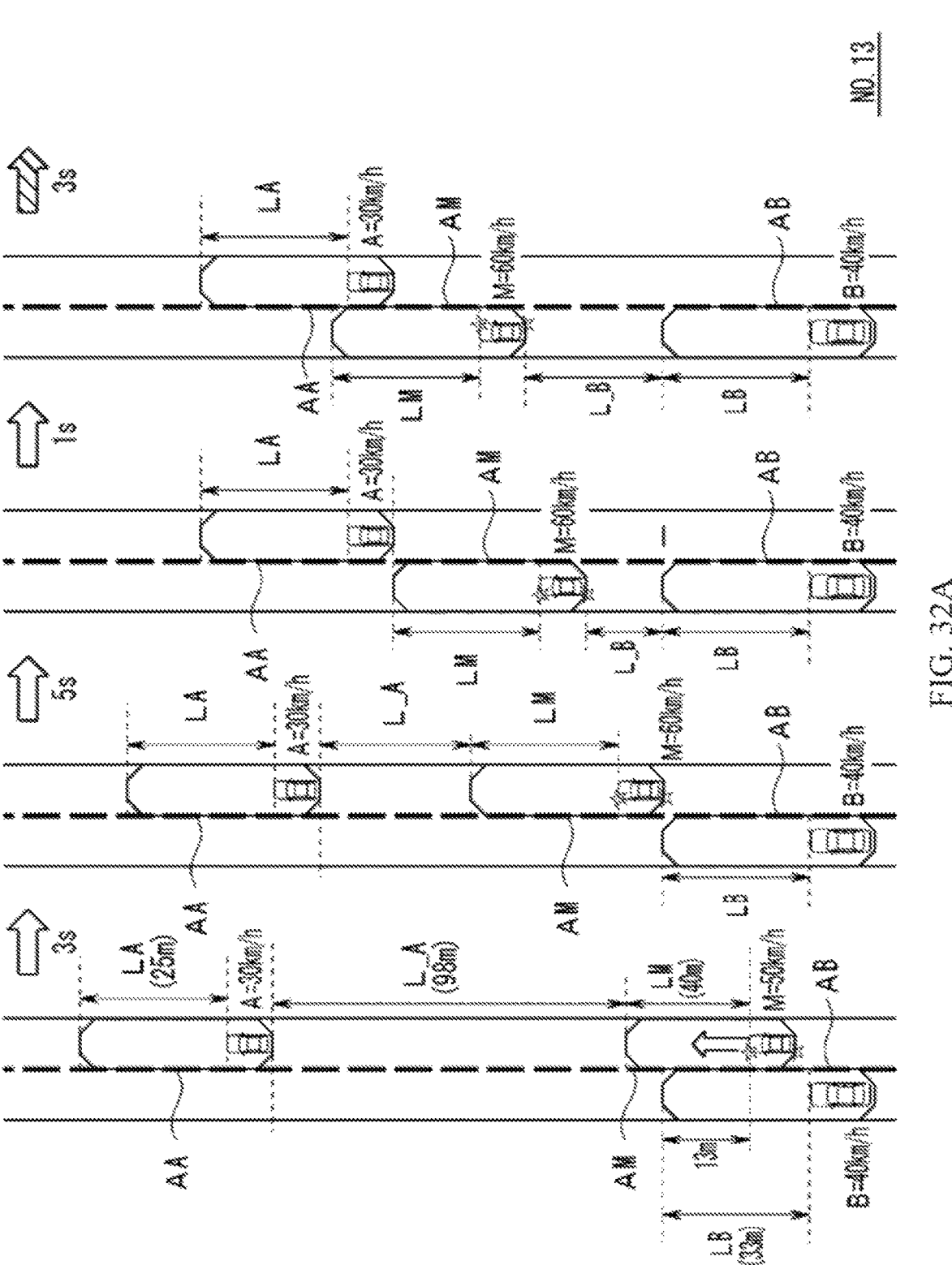
FIG. 32A is an explanatory diagram illustrating a lane change timing in a case of overtaking the preceding vehicle in the thirteenth overtaking mode of the overtaking schedule mode map according to one example embodiment of the disclosure.
Figure 32B:
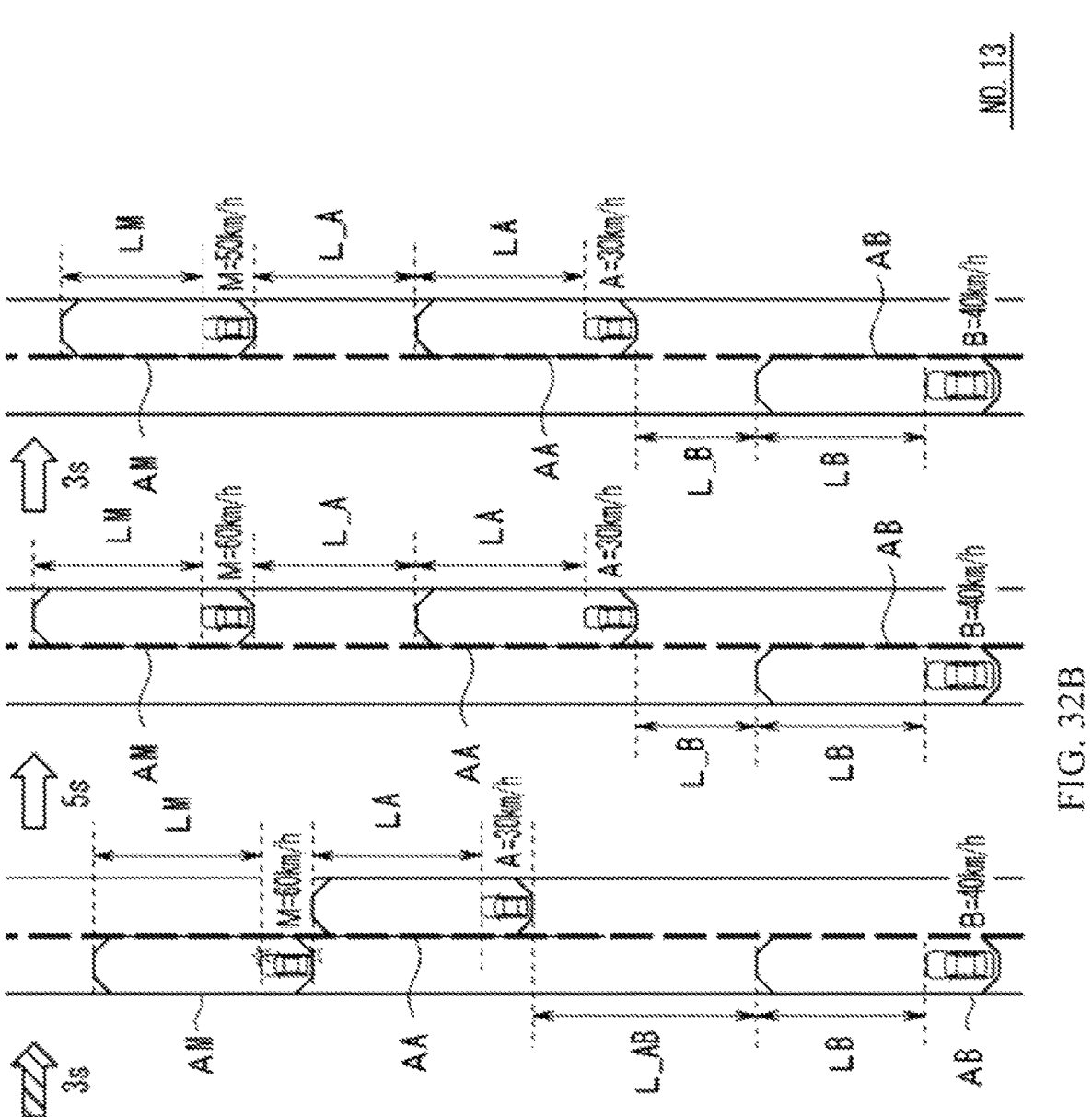
FIG. 32B is an explanatory diagram following FIG. 32A and illustrating the lane change timing in a case of overtaking the preceding vehicle in the thirteenth overtaking mode of the overtaking schedule mode map according to one example embodiment of the disclosure.

Exemplary overtaking control to cause the own vehicle M to overtake the preceding vehicle A in accordance with the schedule set in the thirteenth overtaking mode will now be described with reference to FIGS. 32A and 32B. In this example, the own vehicle M may be accelerated at an acceleration rate of 1 [m/s 2] so that the own vehicle speed VM at 50 kilometers per hour reaches 60 kilometers per hour in one second. In the example illustrated in FIGS. 32A and 32B, the own vehicle speed VM may be 50 kilometers per hour, the preceding vehicle speed VA may be 30 kilometers per hour, and the adjacent-lane vehicle speed VB may be 40 kilometers per hour.

When the overtaking conditions corresponding to the thirteenth overtaking mode are satisfied, the driver assistance control unit 11 may first turn on the turn signal lamp 31 on the lane change side and start accelerating the own vehicle M three seconds before the start of the overtaking control.

Thereafter, the own vehicle speed VM may reach 60 kilometers per hour in three seconds, and the first ALC control may start to move the own vehicle M to the adjacent lane after the cut portions AMc on the rear edge of the own-vehicle no-entry area AM overlap with the cut portions ABc on the front edge of the adjacent-lane-vehicle no-entry area AB. The lane change may be completed in five seconds.

Thereafter, the own vehicle M may travel on the adjacent lane maintaining the vehicle speed VM of 60 kilometers per hour set after the acceleration of the own vehicle M, and overtake the preceding vehicle A. Note that hatched arrows $3s$ in FIGS. 32A and 32B indicate common time.

Thereafter, the second ALC control to return the own vehicle M to the original lane may start after the cut portions AMc on the rear edge of the own-vehicle no-entry area AM overlaps with the cut portions AAc on the front edge of the preceding-vehicle no-entry area AA. The lane change may be completed in five seconds. After the completion of the second ALC control, the own vehicle speed VM may be returned to the initial vehicle speed of 50 kilometers per hour.

[Fourteenth Overtaking Mode]

Figure 33A:
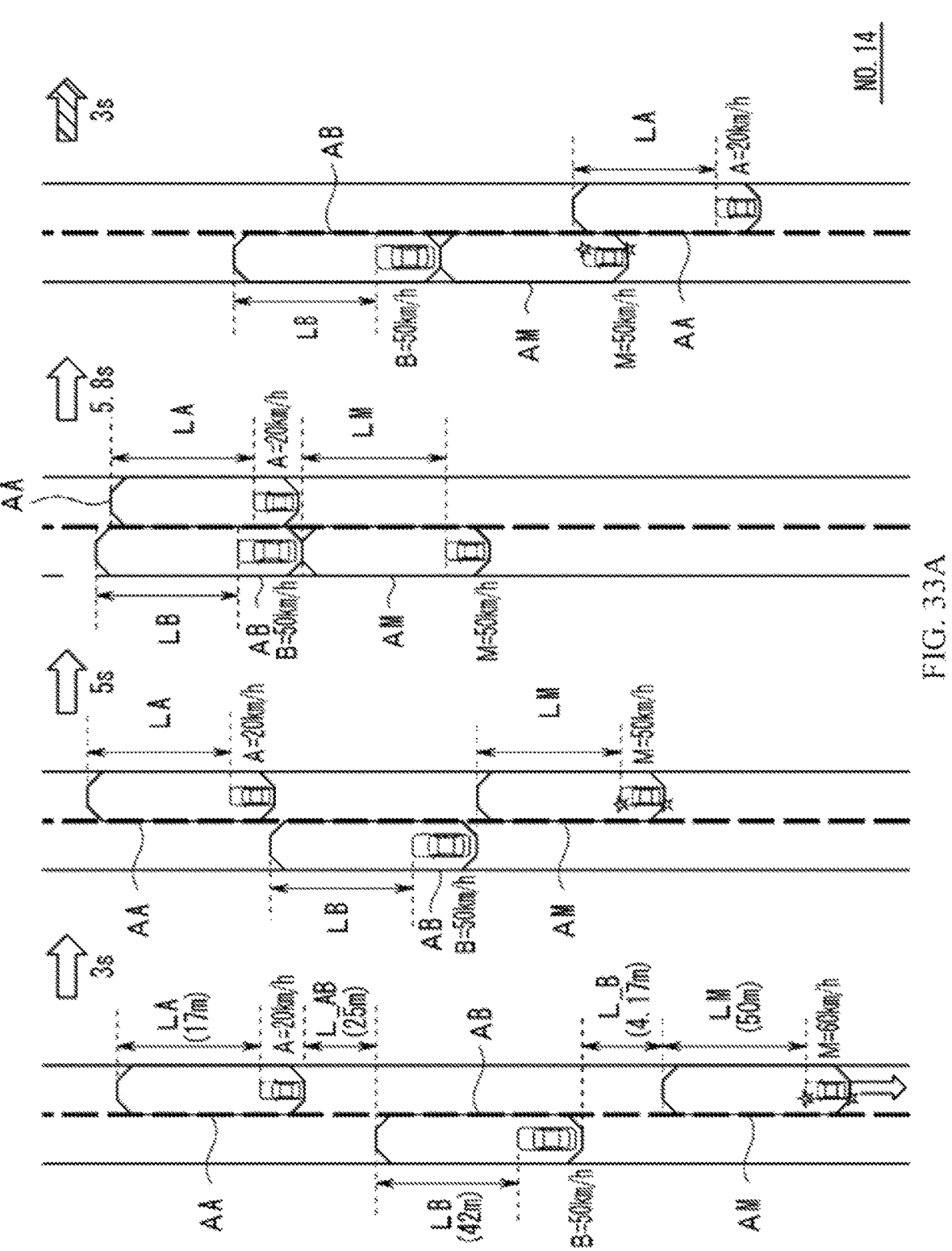
FIG. 33A is an explanatory diagram illustrating a lane change timing in a case of overtaking the preceding vehicle in the fourteenth overtaking mode of the overtaking schedule mode map according to one example embodiment of the disclosure.
Figure 33B:
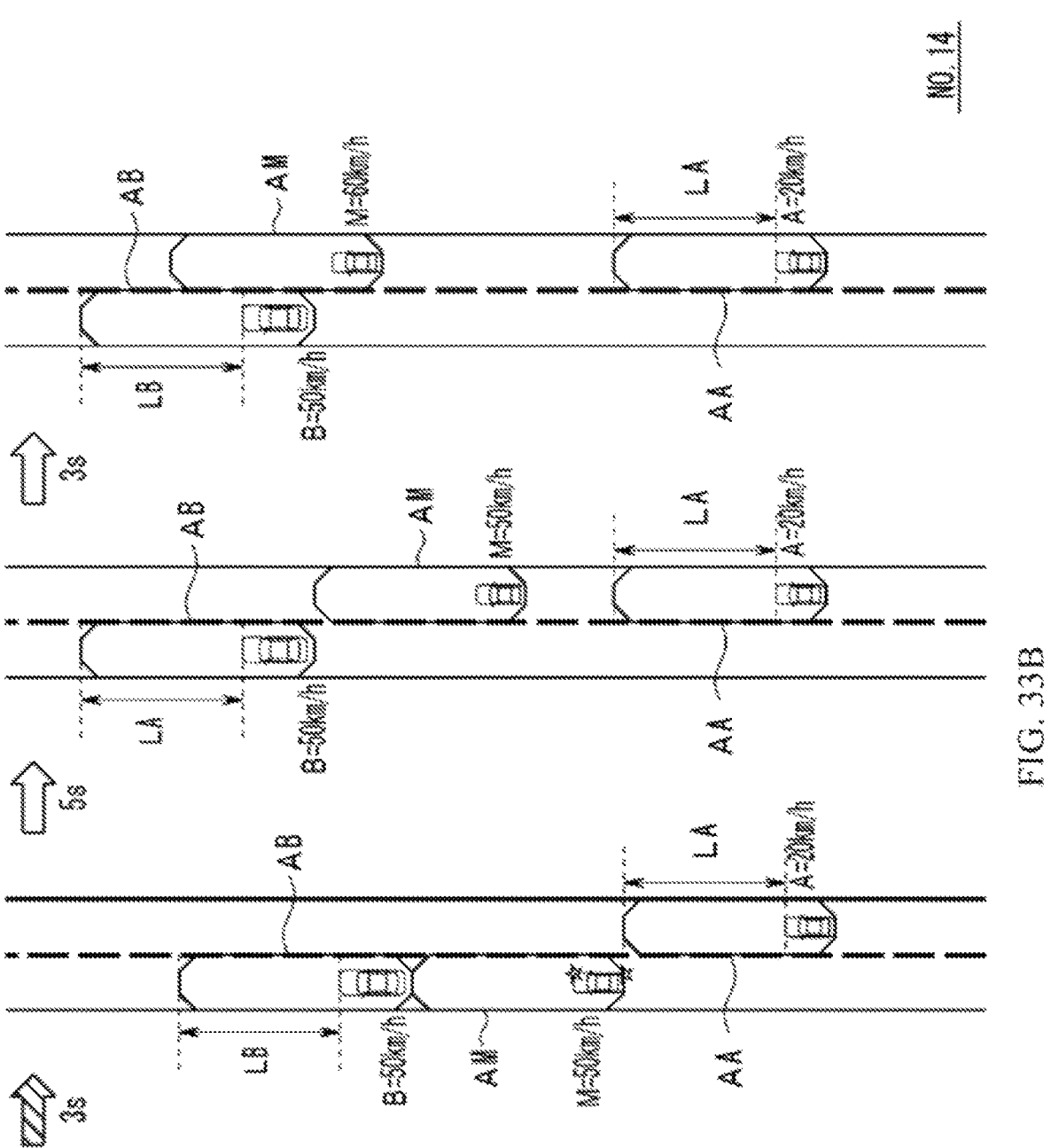
FIG. 33B is an explanatory diagram following FIG. 33A and illustrating the lane change timing in a case of overtaking the preceding vehicle in the fourteenth overtaking mode of the overtaking schedule mode map according to one example embodiment of the disclosure.

Exemplary overtaking control to cause the own vehicle M to overtake the preceding vehicle A in accordance with the schedule set in the fourteenth overtaking mode will now be described with reference to FIGS. 33A and 33B. In this example, the own vehicle M may be decelerated at a deceleration (negative acceleration) rate of 1 [m/s 2] so that the own vehicle speed VM at 60 kilometers per hour decreases to 50 kilometers per hour in one second. In the example illustrated in FIGS. 33A and 33B, the own vehicle speed VM may be 60 kilometers per hour, the preceding vehicle speed VA may be 20 kilometers per hour, and the adjacent-lane vehicle speed VB may be 50 kilometers per hour.

To execute the overtaking control in the fourteenth over-taking mode, the driver assistance control unit 11 may first turn on the turn signal lamp 31 on the lane change side and start decelerating three seconds before the start of the overtaking control. In the example illustrated in FIGS. 33A and 33B, the driver assistance control unit 11 may turn on the turn signal lamp 31 on the lane change side and start decelerating at a position where the front edge of the own-vehicle no-entry area AM is located 4.17 meters behind the adjacent-lane-vehicle no-entry area AB.

In the following three seconds, the own vehicle speed VM may be decelerated to 50 kilometers per hour, and the first ALC control may start immediately before or when the front edge of the own-vehicle no-entry area AM coincides with the adjacent-lane-vehicle no-entry area AB in the lateral direction. The lane change may be completed in five seconds.

Thereafter, the own vehicle M may overtake the preced-ing vehicle A by traveling following the adjacent-lane vehicle B on the adjacent lane. Note that hatched arrows in FIGS. 33A and 33B indicate common time.

Thereafter, the second ALC control to return the own vehicle M to the original lane may start after the cut portions AMc on the rear edge of the own-vehicle no-entry area AM overlap with the cut portions AAc on the front edge of the preceding-vehicle no-entry area AA. The lane change may be completed in five seconds. After the completion of the second ALC control, the own vehicle speed VM may be accelerated to the initial vehicle speed of 60 kilometers per hour, following which the own vehicle M may be caused to travel in the cruising mode.

[Determination of Overtaking Control Interruption]

Figure 34A:
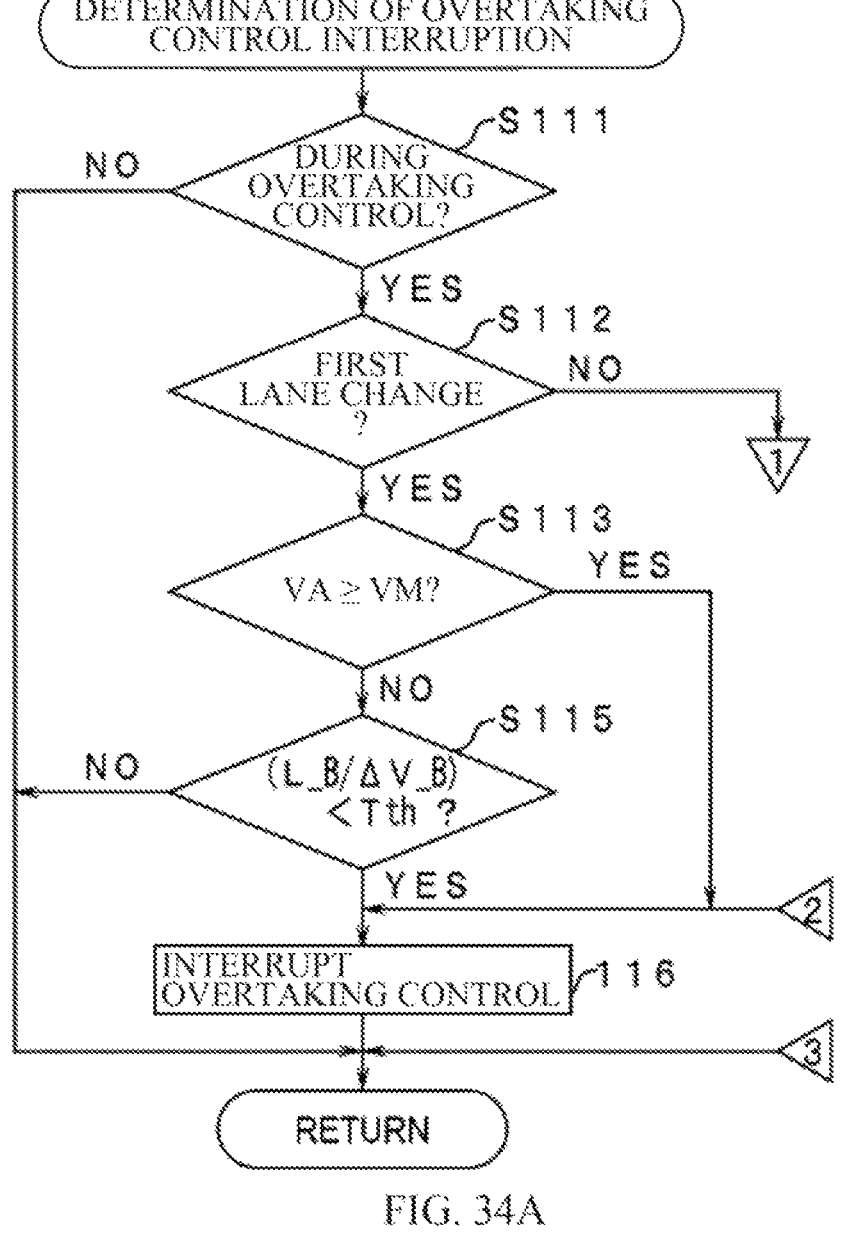
FIG. 34A is a flowchart illustrating a routine of an overtaking control interruption determination according to one example embodiment of the disclosure.
Figure 34B:
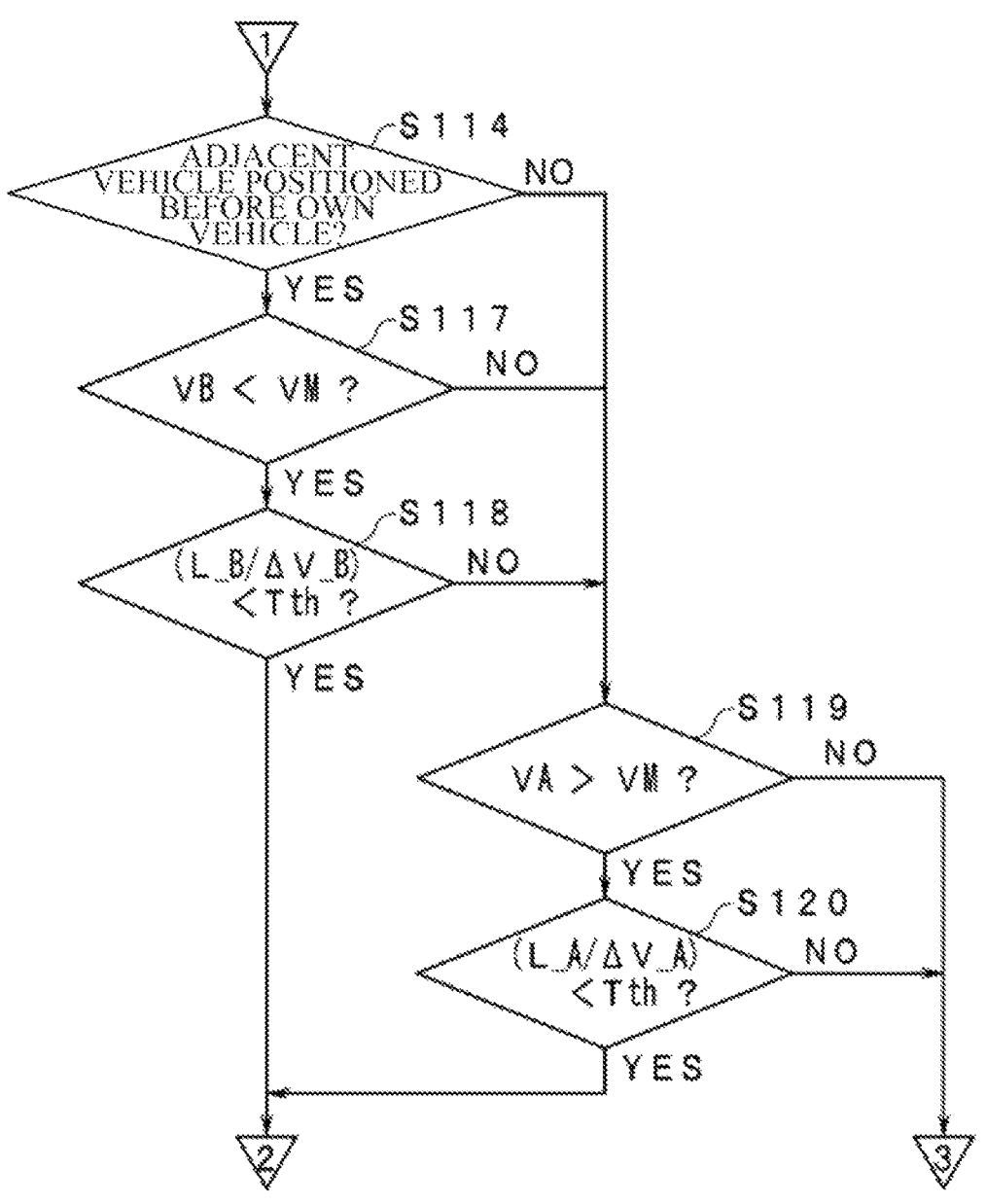
FIG. 34B is a flowchart following FIG. 34A and illustrating the routine of the overtaking control interruption determination according to one example embodiment of the disclosure.

When the overtaking control system of the driver assis-tance control unit 11 is activated, the driver assistance control unit 11 may execute a routine of a determination of overtaking control interruption illustrated in FIGS. 34A and 34B in a predetermined operation cycle. In one embodiment, the driver assistance control unit 11 may serve as an "over-taking control interruption determination unit". The driver assistance control unit 11 may perform the routine illustrated in FIGS. 34A and 34B as a process performed by the overtaking control interruption determination unit.

The routine may start with Step S111 in which the driver assistance control unit 11 determines whether the overtaking control is now being executed. If it is determined that the overtaking control is now being executed (Step S111: YES), that is, when the overtaking control is executed at Step S9 in FIG. 2, the flow may proceed to Step S112. In contrast, if it is not determined that the overtaking control is being executed (Step S111: NO), the flow may exit the routine.

In Step S112, the driver assistance control unit 11 may determine whether a coming lane change corresponds to a first lane change based on the control operations of the overtaking control described above. If the coming lane change corresponds to the first lane change (Step S112: YES), the flow may proceed to Step S113. If the coming lane change corresponds to a second lane change (Step S112: NO), the flow may branch to Step S114. Herein, the first lane change may refer to an operation from the activation of the overtaking control to the start of the first ALC control, and the second lane change may refer to an operation from the completion of the first ALC control to the start of the second ALC control to return the own vehicle M to the original lane.

When it is determined that the coming lane change corresponds to the first lane change (Step S112: YES) and the flow proceeds to Step S113, the driver assistance control unit 11 may compare the current own vehicle speed VM with the current preceding vehicle speed VA. If the current own vehicle speed VM is lower than or equal to the preceding vehicle speed VA (VA≥VM) (Step S113: YES), the driver assistance control unit 11 may determine that the own vehicle M is not to overtake the preceding vehicle A, following which the flow may jump to Step S116. In contrast, if the own vehicle speed VM is higher than the preceding vehicle speed VA (VA<VM) (Step S113: NO), the flow may proceed to Step S115. In Step S115, the current interval area distance L_B between the own-vehicle no-entry area AM and the adjacent-lane-vehicle no-entry area AB in the traveling direction may be divided by a speed difference ΔV_B between the current own vehicle speed VM and the current adjacent-lane vehicle speed VB (=VM−VB) to calculate TTC when the own vehicle M will catch up with the adjacent-lane vehicle B. Thereafter, the TTC(=L_B/ ΔV_B) may be compared with remaining time Tth after the start of the lane change.

The remaining time Tth may be determined by the fol-lowing expression:

$$Tth \leftarrow Tn - Tpast$$

where Tn represents lane change time, and Tpast represents elapsed time from the start of the lane change. In this example embodiment, Tn may be set to five seconds.

If the equation, (L_B/ΔV_B)<Tth holds true (Step S115: YES), the driver assistance control unit 11 may determine that there is a possibility that the own vehicle M will approach the adjacent-lane vehicle B before the completion of the first ALC control, following which the flow may proceed to Step S116. In contrast, if the equation, L_B/ ΔV_B≥Tth holds true (Step S115: NO), the driver assistance control unit 13 may determine that the lane change will be completed within the lane change time Tn, following which the flow may exit the routine.

If it is determined that the coming lane change corre-sponds to the second lane change (Step S112: NO) and the flow branches to Step S114, the driver assistance control unit 11 may determine whether the adjacent-lane vehicle B is traveling in front of the own vehicle M on the adjacent lane based on the positional relation of the own vehicle M with the adjacent-lane vehicle B. If it is determined that the adjacent-lane vehicle B is traveling in front of the own vehicle M (Step S114: YES), the flow may proceed to Step S117. If it is determined that the adjacent-lane vehicle B is traveling behind the own vehicle M (Step S114: NO), the flow may jump to Step S119.

If it is determined that the adjacent-lane vehicle B is traveling in front of the own vehicle M (Step S114: YES) and the flow proceeds to Step S117, the driver assistance control unit 11 may compare the own vehicle speed VM with the adjacent-lane vehicle speed VB. If the adjacent-lane vehicle speed VB is lower than the own vehicle speed VM (VB<VM) (Step S117: YES), the flow may proceed to Step S118. In contrast, if the adjacent-lane vehicle speed VB is higher than or equal to the own vehicle speed VM (VB≥VM) (Step S117: NO), the driver assistance control unit 11 may determine that the own vehicle M will not approach the adjacent-lane vehicle B, following which the flow may branch to Step S119.

In Step S118, the driver assistance control unit 11 may compare the TTC(=L_B/AV B) with the remaining time Tth after the start of the lane change. If the equation, (L_B/AV B)<Tth holds true (Step S118: YES), the driver assistance control unit 11 may determine that there is a possibility that the own vehicle M will approach the adjacent-lane vehicle B before the completion of the second ALC control, following which the flow may return to Step S116. In contrast, if the equation, (L_B/AV B)≥Tth holds true (Step S118: NO), the flow may branch to Step S119.

When the flow branches from any of Steps S114, S117, and S118 to Step S119, the driver assistance control unit 11 may compare the own vehicle speed VM at the start of the second ALC control and the preceding vehicle speed VA at the start of the second ALC control. If the preceding vehicle speed VA is higher than the own vehicle speed VM (VA>VM) (Step S119: YES), the driver assistance control unit 11 may determine that there is a possibility that the own vehicle M will approach the preceding vehicle A, following which the flow may proceed to Step S120. In contrast, if the preceding vehicle speed VA is lower than or equal to the own vehicle speed VM (VA≤VM) (Step S119: NO), the driver assistance control unit 11 may determine that the second ALC control is allowed to be performed, following which the flow may exit the routine.

In Step S120, the interval area distance L_A between the own-vehicle no-entry area AM and the preceding-vehicle no-entry area AA may be divided by a speed difference ΔV_A between the own vehicle speed VM and the preceding vehicle speed VA (=VM−VA) to calculate TTC when the preceding vehicle A will catch up with the own vehicle M before the lane change of the own vehicle M to the original lane. Thereafter, the TTC(=L_A/ΔV_A) may be compared with the remaining time Tth after the start of the lane change. If the equation, (L_A/ΔV_A)<Tth holds true (Step S120: YES), the driver assistance control unit 11 may determine that there is a possibility that the preceding vehicle A will approach the own vehicle M before the completion of the second ALC control, following which the flow may proceed to Step S116. In contrast, if the equation, (L_A/ΔV_A)≥Tth holds true (Step S120: NO), the driver assistance control unit 11 may determine that the second ALC control will be completed within the lane change time Tn, following which the flow may exit the routine.

When the flow proceeds from any of Steps S115, S118, and S120 to Step S116, the driver assistance control unit 11 may interrupt the overtaking control, following which the flow may exit the routine. When the first lane change is interrupted, and the driver assistance control unit 11 may cause the own vehicle M to travel following the preceding vehicle A. When the second lane change is interrupted, the driver assistance control unit 11 may cause the own vehicle M to travel on the adjacent lane.

According to the example embodiment described above, when the own vehicle M is to overtake the preceding vehicle A, the overtaking mode for causing the own vehicle M to overtake the preceding vehicle A and return to a position in front of the preceding vehicle A on the original lane may be set referring to the overtaking schedule mode map based on the positional relations and the relative vehicle speeds of the own vehicle M with the preceding vehicle A and the adjacent-lane vehicle B. Thereafter, the first ALC control to move the own vehicle M to the adjacent lane and the second ALC control to return the own vehicle to the original lane may be sequentially executed in accordance with the set overtaking mode. This enables smooth overtaking without making the driver feel a time delay or feel uncomfortable.

Note that the disclosure is not limited to the above-described example embodiment. For example, even if no vehicle (adjacent-lane vehicle) is traveling on the adjacent lane while the own vehicle M is overtaking the preceding vehicle A by executing the overtaking control during the automatic driving, it is possible to execute the overtaking control according to the example embodiment described above in accordance with the fifth overtaking mode illustrated in FIG. 30.

Further, the overtaking control according to the example embodiment described above may start in response to an instruction issued by the driver by turning on the turn signal lamp switch 26 on the lane change side before the driver assistance control unit 11 causes the notification device 35 to notify the driver of the execution of the overtaking control.

The driver assistance control unit 11, the front recognition sensor 21, the front-side sensor 24, and the rear-side sensor 25 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driver assistance control unit 11, the front recognition sensor 21, the front-side sensor 24, and the rear-side sensor 25 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driver assistance control unit 11, the front recognition sensor 21, the front-side sensor 24, and the rear-side sensor 25 illustrated in FIG. 1.

The invention claimed is:

1. A driver assistance apparatus comprising:
an environment information acquisition unit configured to acquire information on a traveling environment surrounding a first vehicle to which the driver assistance apparatus is to be applied;

an overtaking control processor configured to execute overtaking control based on a relative vehicle speed and a positional relation between the first vehicle and a second vehicle and a relative vehicle speed and a positional relation between the first vehicle and a third vehicle that are detected based on the information on the traveling environment acquired by the environment information acquisition unit, the second vehicle comprising a vehicle traveling immediately in front of the first vehicle, the third vehicle comprising a vehicle traveling on an adjacent lane; and a first-vehicle speed detector configured to detect a vehicle speed of the first vehicle, wherein the overtaking control processor comprises:

an overtaking schedule generator configured to generate an overtaking schedule regarding first automatic lane change control and second automatic lane change control in advance before a start of the overtaking control, the first automatic lane change control comprising control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, the second automatic lane change control comprising control adapted to cause the first vehicle to overtake the second vehicle and return from the adjacent lane to the original lane; and an overtaking control execution unit configured to automatically execute the overtaking control in accordance with the overtaking schedule generated by the overtaking schedule generator, wherein the overtaking control processor further comprises:

a first-vehicle no-entry area setting unit configured to set a first-vehicle no-entry area based on the vehicle speed of the first vehicle detected by the first-vehicle speed detector, the first-vehicle no-entry area comprising a safety area extending from a rear end of the first vehicle in a frontward direction;

a second-vehicle no-entry area setting unit configured to set a second-vehicle no-entry area based on a vehicle speed of the second vehicle detected based on the information on the traveling environment acquired by the environment information acquisition unit, the second-vehicle no-entry area comprising a safety area extending from a rear end of the second vehicle in a forward direction; and a third-vehicle no-entry area setting unit configured to set a third-vehicle no-entry area based on a vehicle speed of the third vehicle detected based on the information on the traveling environment acquired by the environment information acquisition unit, the third-vehicle no-entry area comprising a safety area extending from a rear end of the third vehicle in the forward direction, and wherein the overtaking schedule generator is configured to generate the overtaking schedule adapted to interrupt the first automatic lane change control in a case where the vehicle speed of the first vehicle is higher than the vehicle speed of the third vehicle and where the first-vehicle no-entry area set by the first-vehicle no-entry area setting unit is located behind the third-vehicle no-entry area set by the third-vehicle no-entry area setting unit.

2. The driver assistance apparatus according to claim 1, wherein the first-vehicle no-entry area setting unit is configured to set the first-vehicle no-entry area based on first time-to-contact set in advance and a current vehicle speed of the first vehicle, the second-vehicle no-entry area setting unit is configured to set the second-vehicle no-entry area based on the first time-to-contact and a current vehicle speed of the second vehicle, and the third-vehicle no-entry area setting unit is configured to set the third-vehicle no-entry area based on the first time-to-contact and a current vehicle speed of the third vehicle.

3. The driver assistance apparatus according to claim 2, wherein the first-vehicle no-entry area set by the first-vehicle no-entry area setting unit has two front corners and two rear corners that are provided with respective cut portions set based on second time-to-contact and the vehicle speed of the first vehicle, the second time-to-contact being shorter than the first time-to-contact, the second-vehicle no-entry area set by the second-vehicle no-entry area setting unit has two front corners and two rear corners that are provided with respective cut portions set based on the second time-to-contact and the vehicle speed of the second vehicle, and the third-vehicle no-entry area set by the third-vehicle no-entry area setting unit has two front corners and two rear corners that are provided with respective cut portions set based on the second time-to-contact and the vehicle speed of the third vehicle.

4. A driver assistance apparatus comprising:

an environment information acquisition unit configured to acquire information on a traveling environment surrounding a first vehicle to which the driver assistance apparatus is to be applied; and an overtaking control processor configured to execute overtaking control based on a relative vehicle speed and a positional relation between the first vehicle and a second vehicle and a relative vehicle speed and a positional relation between the first vehicle and a third vehicle that are detected based on the information on the traveling environment acquired by the environment information acquisition unit, the second vehicle comprising a vehicle traveling immediately in front of the first vehicle, the third vehicle comprising a vehicle traveling on an adjacent lane, wherein the overtaking control processor comprises:

an overtaking schedule generator configured to generate an overtaking schedule regarding first automatic lane change control and second automatic lane change control in advance before a start of the overtaking control, the first automatic lane change control comprising control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, the second automatic lane change control comprising control adapted to cause the first vehicle to overtake the second vehicle and return from the adjacent lane to the original lane; and an overtaking control execution unit configured to automatically execute the overtaking control in accordance with the overtaking schedule generated by the overtaking schedule generator, and wherein the driver assistance apparatus further comprising an overtaking control interruption determination unit configured to:

interrupt the first automatic lane change control when the vehicle speed of the second vehicle is higher than the vehicle speed of the first vehicle upon a start of the first automatic lane change control, and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

5. The driver assistance apparatus according to claim 1, further comprising an overtaking control interruption determination unit configured to:

interrupt the first automatic lane change control when the vehicle speed of the second vehicle is higher than the vehicle speed of the first vehicle upon a start of the first automatic lane change control; and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

6. The driver assistance apparatus according to claim 4, further comprising an overtaking control interruption determination unit configured to:

interrupt the first automatic lane change control when the vehicle speed of the second vehicle is higher than the vehicle speed of the first vehicle upon a start of the first automatic lane change control; and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

7. A driver assistance apparatus comprising a sensor configured to acquire information on a traveling environment surrounding a first vehicle to which the driver assistance apparatus is to be applied;

a first-vehicle speed detector configured to detect a vehicle speed of the first vehicle; and circuitry configured to;

execute overtaking control based on a relative vehicle speed and a positional relation between the first vehicle and a second vehicle and a relative vehicle speed and a positional relation between the first vehicle and a third vehicle that are detected based on the information on the traveling environment acquired by the sensor, the second vehicle comprising a vehicle traveling immediately in front of the first vehicle, the third vehicle comprising a vehicle traveling on an adjacent lane;

when the overtaking control is to be executed, generate an overtaking schedule regarding first automatic lane change control and second automatic lane change control in advance before starting the overtaking control, and automatically execute the overtaking control in accordance with the overtaking schedule generated, the first automatic lane change control comprising control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, the second automatic lane change control comprising control adapted to cause the first vehicle to overtake the second vehicle and return from the adjacent lane to the original lane, set a first-vehicle no-entry area based on the vehicle speed of the first vehicle detected by the first-vehicle speed detector, the first-vehicle no-entry area comprising a safety area extending from a rear end of the first vehicle in a frontward direction;

set a second-vehicle no-entry area based on a vehicle speed of the second vehicle detected based on the information on the traveling environment acquired by the sensor, the second-vehicle no-entry area comprising a safety area extending from a rear end of the second vehicle in a forward direction;

set a third-vehicle no-entry area based on a vehicle speed of the third vehicle detected based on the information on the traveling environment acquired by the sensor, the third-vehicle no-entry area comprising a safety area extending from a rear end of the third vehicle in the forward direction; and generate the overtaking schedule adapted to interrupt the first automatic lane change control in a case where the vehicle speed of the first vehicle is higher than the vehicle speed of the third vehicle and where the first-vehicle no-entry area set by the first-vehicle no-entry area setting unit is located behind the third-vehicle no-entry area set by the third-vehicle no-entry area setting unit.

8. The driver assistance apparatus according to claim 7, wherein the circuitry is further configured to:

interrupt the first automatic lane change control when the vehicle speed of the second vehicle is higher than the vehicle speed of the first vehicle upon a start of the first automatic lane change control; and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

9. A driver assistance apparatus comprising a sensor configured to acquire information on a traveling environment surrounding a first vehicle to which the driver assistance apparatus is to be applied; and circuitry configured to:

execute overtaking control based on a relative vehicle speed and a positional relation between the first vehicle and a second vehicle and a relative vehicle speed and a positional relation between the first vehicle and a third vehicle that are detected based on the information on the traveling environment acquired by the sensor, the second vehicle comprising a vehicle traveling immediately in front of the first vehicle, the third vehicle comprising a vehicle traveling on an adjacent lane;

when the overtaking control is to be executed, generate an overtaking schedule regarding first automatic lane change control and second automatic lane change control in advance before starting the overtaking control, and automatically execute the overtaking control in accordance with the overtaking schedule generated, the first automatic lane change control comprising control adapted to move the first vehicle traveling on an original lane to a position in front of or behind the third vehicle traveling on the adjacent lane based on the positional relation and the relative vehicle speed between the first vehicle and the second vehicle and the positional relation and the relative vehicle speed between the first vehicle and the third vehicle, the second automatic lane change control comprising control adapted to cause the first vehicle to overtake the second vehicle and return from the adjacent lane to the original lane;

interrupt the first automatic lane change control when the vehicle speed of the second vehicle is higher than the vehicle speed of the first vehicle upon a start of the first automatic lane change control; and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

10. The driver assistance apparatus according to claim 9, wherein the circuitry is further configured to:

interrupt the first automatic lane change control when the vehicle speed of the second vehicle is higher than the vehicle speed of the first vehicle upon a start of the first automatic lane change control; and interrupt the second automatic lane change control when the vehicle speed of the third vehicle is lower than the vehicle speed of the first vehicle upon a start of the second automatic lane change control after execution of the first automatic lane change control adapted to move the first vehicle to the position behind the third vehicle traveling on the adjacent lane.

* * * * *